(12) United States Patent
Hsu et al.

(10) Patent No.: US 9,348,115 B1
(45) Date of Patent: May 24, 2016

(54) PHOTOGRAPHING LENS SYSTEM, IMAGE CAPTURING DEVICE AND ELECTRONIC TERMINAL

(71) Applicant: LARGAN PRECISION CO., LTD., Taichung (TW)

(72) Inventors: Chih-Wen Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 9 days.

(21) Appl. No.: 14/556,275

(22) Filed: Dec. 1, 2014

(30) Foreign Application Priority Data

Oct. 30, 2014 (TW) .............................. 103137652 A

(51) Int. Cl.
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC ............................... G02B 9/60; G02B 13/0045
USPC ......................................... 359/714, 763, 770
See application file for complete search history.

(56) References Cited

U.S. PATENT DOCUMENTS

| 5,703,726 | A | 12/1997 | Griffith | |
|---|---|---|---|---|
| 7,502,180 | B2 * | 3/2009 | Tsuchimochi | G02B 13/04 359/740 |
| 7,515,351 | B2 | 4/2009 | Chen et al. | |
| 8,174,777 | B2 | 5/2012 | Tang et al. | |
| 8,248,713 | B2 | 8/2012 | Hsieh et al. | |
| 8,345,358 | B2 | 1/2013 | Hsu et al. | |
| 8,395,853 | B2 | 3/2013 | Chen et al. | |
| 8,593,741 | B2 | 11/2013 | Ishihara | |
| 8,654,458 | B2 | 2/2014 | Tsai et al. | |
| 8,699,150 | B1 | 4/2014 | Hsieh et al. | |

(Continued)

FOREIGN PATENT DOCUMENTS

JP 2008158198 A 7/2008
JP 2010-249873 11/2010

(Continued)

OTHER PUBLICATIONS

English translation of abstract of JP 2010-249873 (published Nov. 4, 2010).
English translation of abstract of JP 2013-025202 (published Feb. 4, 2013).

*Primary Examiner* — Darryl J Collins
(74) *Attorney, Agent, or Firm* — McClure, Qualey & Rodack, LLP

(57) ABSTRACT

A photographing lens system includes, in order from an object side to an image side, a first lens element, a second lens element, a third lens element, a fourth lens element and a fifth lens element. The first lens element with negative refractive power has a concave image-side surface. The second lens element has refractive power. The third lens element with positive refractive power has a convex object-side surface and a convex image-side surface. The fourth lens element with negative refractive power has a concave image-side surface, wherein an object-side surface and the image-side surface of the fourth lens element are aspheric. The fifth lens element with positive refractive power has a convex object-side surface and a convex image-side surface, wherein the object-side surface and the image-side surface of the fifth lens element are aspheric.

24 Claims, 23 Drawing Sheets

(56) References Cited

U.S. PATENT DOCUMENTS

2009/0141368 A1* 6/2009 Iyama .................. G02B 13/18
359/717
2011/0205635 A1* 8/2011 Tang .................... G02B 15/177
359/684
2015/0168676 A1 6/2015 Lee et al.

FOREIGN PATENT DOCUMENTS

| JP | 2011085744 A | 4/2011 |
| JP | 2013-025202 | 2/2013 |
| TW | 201425994 A | 7/2014 |

* cited by examiner

PHOTOGRAPHING LENS SYSTEM, IMAGE CAPTURING DEVICE AND ELECTRONIC TERMINAL

RELATED APPLICATIONS

This application claims priority to Taiwan Application Serial Number 103137652, filed Oct. 30, 2014, which is incorporated by reference herein in its entirety.

BACKGROUND

1. Technical Field

The present disclosure relates to a photographing lens system and an image capturing device. More particularly, the present disclosure relates to a compact photographing lens system with a wide field of view and an image capturing device which is applicable to electronic terminals.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system with a wide field of view employed in a portable electronic product mainly adopts a four-element lens structure. Due to the popularity of electronic terminals with a wide field of view, such as driving recorders, rear view camera systems, sports cameras and portable wireless cameras, the requirements for high resolution and image quality of present compact optical systems increase significantly. However, the conventional optical systems cannot satisfy these requirements of the compact optical systems with a wide field of view.

Other conventional compact optical systems with five-element lens structure are also developed. However, the refractive power of the lens elements, which is favorable for enlarging the field of view, might lead to problems of image distortion, vignetting at the periphery of the image and difficulty for miniaturizing.

SUMMARY

According to one aspect of the present disclosure, a photographing lens system includes, in order from an object side to an image side, a first lens element, a second lens element, a third lens element, a fourth lens and a fifth lens element. The first lens element with negative refractive power has a concave image-side surface. The second lens element has refractive power. The third lens element with positive refractive power has a convex object-side surface and a convex image-side surface. The fourth lens element with negative refractive power has a concave object-side surface, wherein the object-side surface and an image-side surface of the fourth lens element are aspheric. The fifth lens element with positive refractive power has a convex object-side surface and a convex image-side surface, wherein the object-side surface and the image-side surface of the fifth lens element are aspheric, and at least one of the object-side surface and the image-side surface of the fifth lens element has at least one inflection point in an off-axial region thereon. The photographing lens system has a total of five lens elements with refractive power. An air gap is between any two of the first lens element, the second lens element, the third lens element, the fourth lens element and the fifth lens element that are adjacent to each other. When a central thickness of the second lens element is CT2, a sum of central thicknesses of the first lens element, the second lens element, the third lens element, the fourth lens element and the fifth lens element is $\Sigma CT$, a curvature radius of the object-side surface of the fourth lens element is R7, a curvature radius of the image-side surface of the fourth lens element is R8, and an axial distance between the second lens element and the third lens element is T23, the following conditions are satisfied:

$1.0 < \Sigma CT/CT2 < 3.0;$ $(R7+R8)/(R7-R8) < -0.70;$ and $T23/CT2 < 0.55.$

According to another aspect of the present disclosure, an image capturing device includes the photographing lens system according to the aforementioned aspect and an image sensor, wherein the image sensor is disposed on an image surface of the photographing lens system.

According to still another aspect of the present disclosure, an electronic terminal includes the image capturing device according to the foregoing aspect.

According to yet another aspect of the present disclosure, a photographing lens system includes, in order from an object side to an image side, a first lens element, a second lens element, a third lens element, a fourth lens and a fifth lens element. The first lens element with negative refractive power has a concave image-side surface. The second lens element has refractive power. The third lens element with positive refractive power has a convex object-side surface and a convex image-side surface. The fourth lens element with negative refractive power has a concave object-side surface, wherein the object-side surface and an image-side surface of the fourth lens element are aspheric, and at least one of the object-side surface and the image-side surface of the fourth lens element has at least one inflection point in an off-axial region thereon. The fifth lens element with positive refractive power has a convex object-side surface and a convex image-side surface, wherein the object-side surface and the image-side surface of the fifth lens element are aspheric, and at least one of the object-side surface and the image-side surface of the fifth lens element has at least one inflection point in an off-axial region thereon. The photographing lens system has a total of five lens elements with refractive power. An air gap is between any two of the first lens element, the second lens element, the third lens element, the fourth lens element and the fifth lens element that are adjacent to each other. When a central thickness of the second lens element is CT2, a sum of central thicknesses of the first lens element, the second lens element, the third lens element, the fourth lens element and the fifth lens element is $\Sigma CT$, a curvature radius of the object-side surface of the fourth lens element is R7, and a curvature radius of the image-side surface of the fourth lens element is R8, the following conditions are satisfied:

$1.0 < \Sigma CT/CT2 < 3.0;$ and $(R7+R8)/(R7-R8) < -0.70.$

According to further another aspect of the present disclosure, an image capturing device includes the photographing lens system according to the aforementioned aspect and an image sensor, wherein the image sensor is disposed on an image surface of the photographing lens system.

According to still another aspect of the present disclosure, an electronic terminal includes the image capturing device according to the foregoing aspect.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
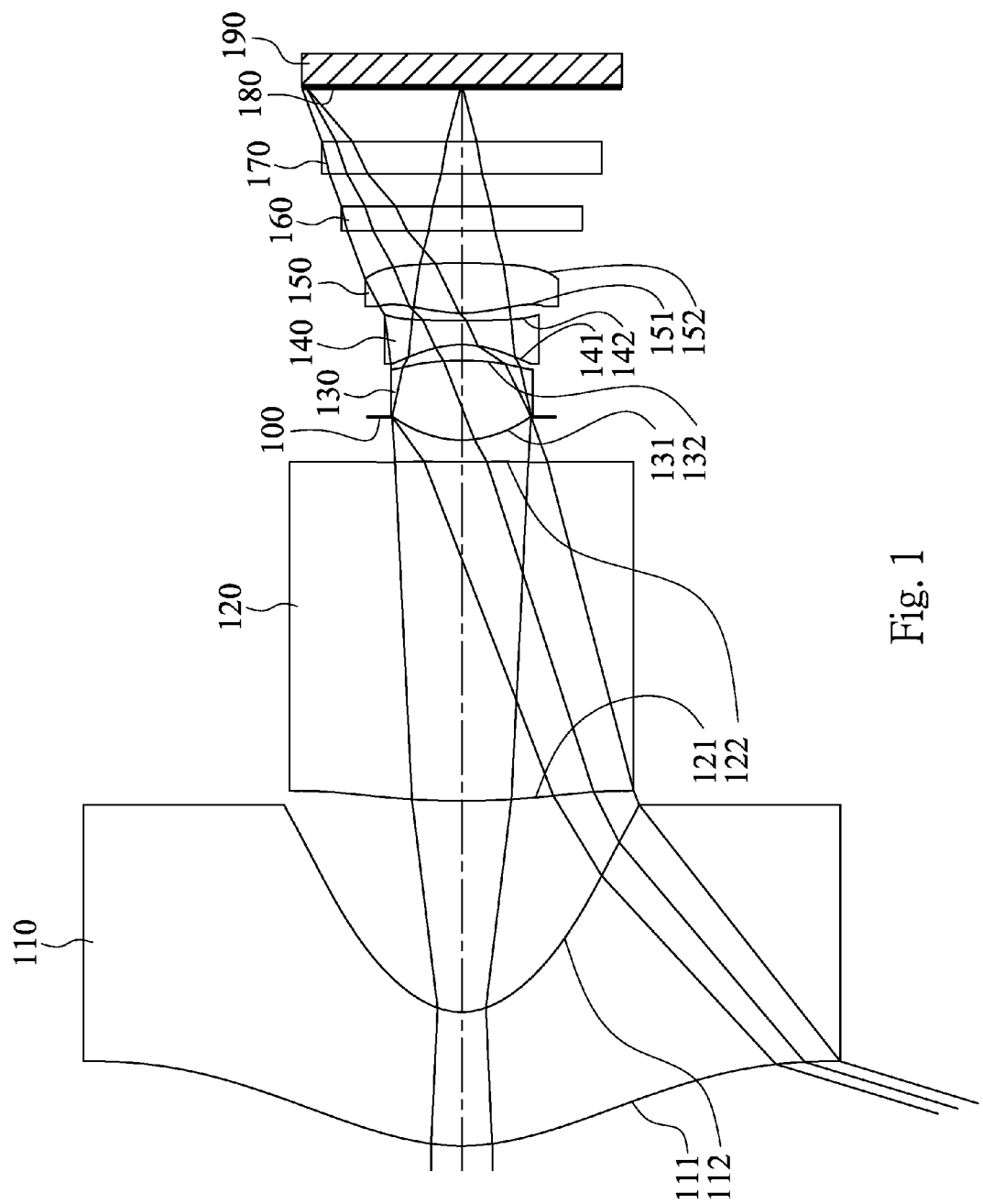
FIG. 1 is a schematic view of an image capturing device according to the 1st embodiment of the present disclosure.

A photographing lens system includes, in order from an object side to an image side, a first lens element, a second lens element, a third lens element, a fourth lens element and a fifth lens element. The photographing lens system has a total of five lens elements with refractive power.

According to the photographing lens system of the present disclosure, there is an air gap between any two of the first lens element, the second lens element, the third lens element, the fourth lens element and the fifth lens element that are adjacent to each other, that is, each of the first through fifth lens elements of the photographing lens system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing lens system. Therefore, there is an air gap between any two of the first lens element, the second lens element, the third lens element, the fourth lens element, and the fifth lens element that are adjacent to each other in the present disclosure for resolving the problem generated by the cemented lens elements.

The first lens element with negative refractive power can have a convex object-side surface and has a concave image-side surface. Therefore, it is favorable for obtaining wider image field for the photographing lens system and effectively reducing astigmatism thereof so as to maintain the superior image quality.

The second lens element can have positive refractive power. Therefore, it is favorable for reducing the total track length of the photographing lens system so as to maintain the compact size thereof.

The third lens element with positive refractive power has a convex object-side surface and a convex image-side surface. Therefore, it is favorable for balancing the arrangement of positive refractive power and reducing the spherical aberration so as to reduce the photosensitivity.

The fourth lens element with negative refractive power has a concave object-side surface. Therefore, it is favorable for effectively correcting the astigmatism of the photographing lens system. Furthermore, at least one of the object-side surface and the image-side surface of the fourth lens element can have at least one inflection point in an off-axial region thereon. Therefore, it is favorable for reducing the image distortion and the vignetting at the periphery of the image by controlling the surface shape of the fourth lens element.

The fifth lens element with positive refractive power has a convex object-side surface and a convex image-side surface. Therefore, it is favorable for correcting high-order aberration and spherical aberration of the photographing lens system so as to improve the image quality. Furthermore, at least one of the object-side surface and the image-side surface of the fifth lens element has at least one inflection point in an off-axial region thereon. Therefore, it is favorable for reducing the image distortion and the vignetting at the periphery of the image, while improving the manufacturability and reducing the photosensitivity by controlling the surface shape of the fifth lens element.

When a central thickness of the second lens element is CT2, and a sum of central thicknesses of the first lens element, the second lens element, the third lens element, the fourth lens element and the fifth lens element is $\Sigma CT$, the following condition is satisfied: $1.0 < \Sigma CT/CT2 < 3.0$. Therefore, it is favorable for providing the second lens element with a sufficient thickness so as to correct the high-order aberration of the photographing lens system with a wide field of view. Preferably, the following condition is satisfied: $1.3<\Sigma CT/CT2<2.5$.

When a curvature radius of the object-side surface of the fourth lens element is R7, and a curvature radius of the image-side surface of the fourth lens element is R8, the following condition is satisfied: $(R7+R8)/(R7-R8)<-0.70$. Therefore, it is favorable for correcting the aberration, improving the manufacturability, and reducing the photosensitivity of the photographing lens system by adjusting the surface shape of the fourth lens element. Preferably, the following condition is satisfied: $-2.5<(R7+R8)/(R7-R8)<-0.80$.

When an axial distance between the second lens element and the third lens element is T23, and the central thickness of the second lens element is CT2, the following condition is satisfied: $T23/CT2<0.55$. Therefore, it is favorable for manufacturing and assembling the lens elements so as to increase the manufacturing yield rate. Preferably, the following condition is satisfied: $T23/CT2<0.50$. More preferably, the following condition is satisfied: $T23/CT2<0.45$.

When a maximal field of view of the photographing lens system is FOV, the following condition is satisfied: $120$ degrees $<FOV \leq 200$ degrees. Therefore, it is favorable for providing the photographing lens system with a wider field of view.

When a focal length of the photographing lens system is f, and a composite focal length of the first lens element and the second lens element is f12, the following condition is satisfied: $0<f/f12<0.40$. Therefore, it is favorable for both the wide field of view and the compact size thereof by properly adjusting refractive power of the first lens element and the second lens element.

When the focal length of the photographing lens system is f, and a focal length of the second lens element is f2, the following condition is satisfied: $|f/f2|<0.30$. Therefore, it is favorable for effectively correcting the aberration by adjusting refractive power of the second lens element so as to improve the image quality.

When the focal length of the photographing lens system is f, a curvature radius of an object-side surface of the second lens element is R3, and a curvature radius of an image-side surface of the second lens element is R4, the following condition is satisfied: $0.75<|f/R3|+|f/R4|<1.50$. Therefore, it is favorable for correcting the spherical aberration and astigmatism so as to improve the image quality.

When a refractive index of the second lens element is N2, and a refractive index of the fourth lens element is N4, the following condition is satisfied: $3.0<N2+N4<3.5$. Therefore, it is favorable for obtaining the superior arrangement of refractive index and correcting the chromatic aberration When the axial distance between the second lens element and the third lens element is T23, and a central thickness of the third lens element is CT3, the following condition is satisfied: $T23<CT3$. Therefore, it is favorable for increasing the assembling rate of the lens elements and reducing the problems of poor molding resulted from the lens elements with excessively small thickness.

The photographing lens system can further include a stop, such as an aperture stop, which is disposed between the second lens element and the third lens element. Therefore, it is favorable for enlarging the field of view of the photographing lens system so as to take the advantages of the wide field of view thereof.

According to the photographing lens system of the present disclosure, the lens elements thereof can be made of plastic or glass material. When the lens elements are made of plastic material, the manufacturing cost can be effectively reduced. When the lens elements are made of glass material, the arrangement of the refractive power of the photographing lens system may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens system can also be reduced.

According to the photographing lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Furthermore, when the lens element has positive refractive power or negative refractive power, it indicates that the lens element has refractive power in the paraxial region thereof. When the lens element has a focal length, it indicates that the lens element has a focal length in the paraxial region thereof.

According to the photographing lens system of the present disclosure, an image surface, depending on the corresponding image sensor, can be a plane surface or a curved surface with any curvature. When the image surface is a curved surface, it is particularly indicates a concave surface toward the object side.

According to the photographing lens system of the present disclosure, an aperture stop can be configured as a middle stop. A middle stop disposed between the first lens element and the image surface is favorable for enlarging the field of view of the photographing lens system and thereby provides a wider field of view for the same.

According to the photographing lens system of the present disclosure, the photographing lens system can include at least one stop, such as an aperture stop, a glare stop or a field stop. The glare stop or the field stop is for eliminating the stray light and thereby improving the image resolution thereof.

According to the photographing lens system of the present disclosure, the photographing lens system can be optionally applied to moving focus optical systems. Furthermore, the photographing lens system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an image capturing device is provided. The image capturing device includes the aforementioned photographing lens system according to the present disclosure and an image sensor, wherein the image sensor is disposed on or near an image surface of the aforementioned photographing lens system. In the photographing lens system of the image capturing device, it is favorable for correcting the aberration, improving the manufacturability, and reducing the photosensitivity by properly adjusting the arrangement and the surface shape of the lens elements. Moreover, it is favorable for correcting the high-order aberration of the photographing lens system with a wide field of view by adjusting thickness of the second lens element. Preferably, the image capturing device can further include a barrel member, a holder member or a combination thereof.

According to the present disclosure, an electronic terminal is provided, wherein the electronic terminal includes the aforementioned image capturing device. Therefore, it is favorable for wide field of view, superior arrangement and surface shape of the lens elements so as to correct the aberration, improve the manufacturability, and reduce the photosensitivity. Preferably, the electronic terminal can further include but not limited to a control unit, a display, a storage unit, a random access memory unit (RAM) or a combination thereof.

According to the above description of the present disclosure, the following 1st-14th specific embodiments are provided for further explanation.

1st Embodiment

Figure 2:
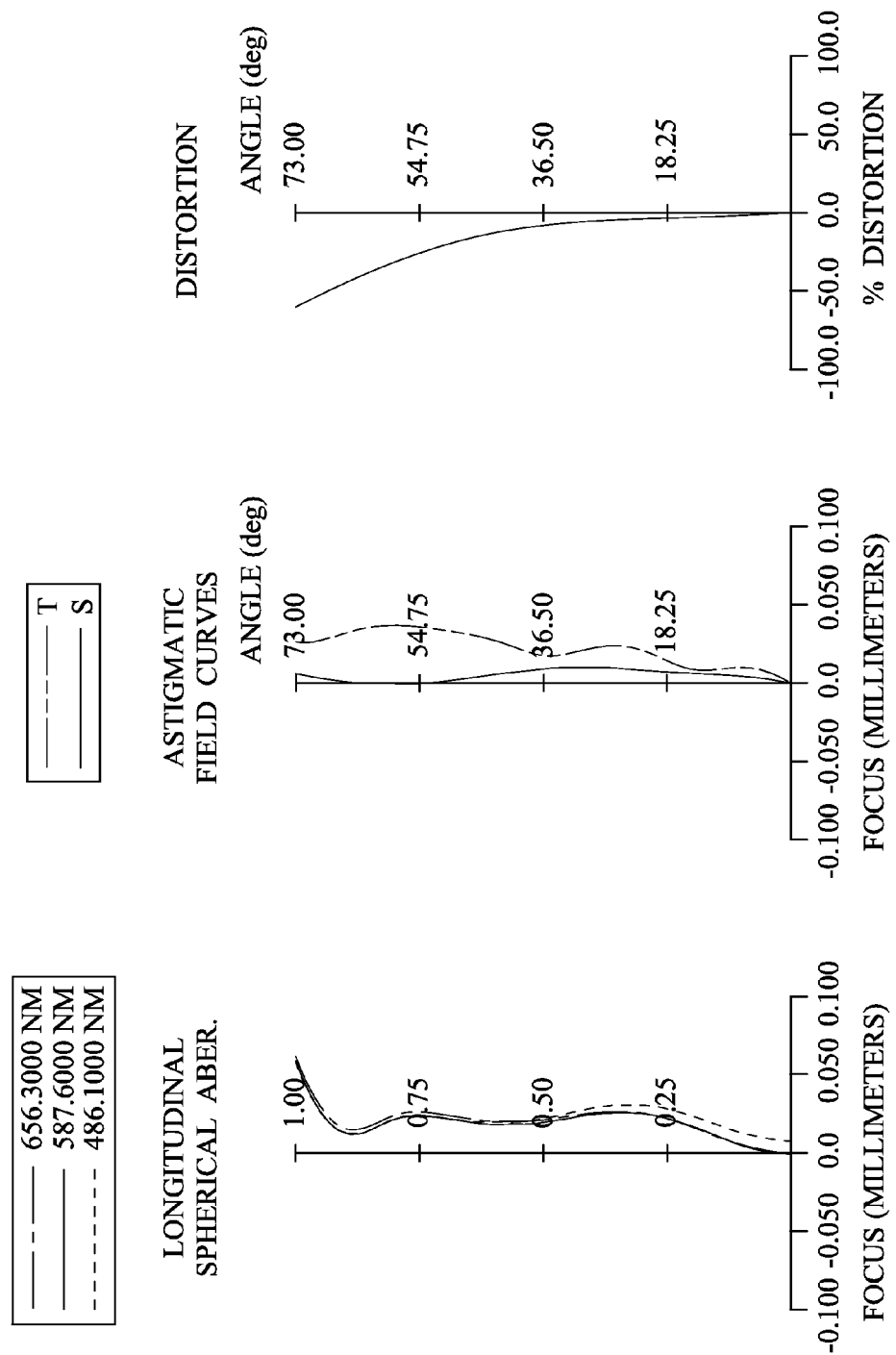
FIG. 2 shows spherical aberration curves, astigmatic field curves and a distortion curve of the image capturing device according to the 1st embodiment.

FIG. 1 is a schematic view of a photographing lens system according to the 1st embodiment of the present disclosure. FIG. 2 shows, in order from left to right, spherical aberration curves, astigmatic field curves and a distortion curve of the photographing lens system according to the 1st embodiment.

In FIG. 1, the image capturing device includes the photographing lens system (its reference numeral is omitted) of the present disclosure and an image sensor 190. The photographing lens system includes, in order from an object side to an image side, a first lens element 110, a second lens element 120, an aperture stop 100, a third lens element 130, a fourth lens element 140, a fifth lens element 150, an IR-cut filter 160, a cover glass 170 and an image surface 180. The image sensor 190 is disposed on the image surface 180 of the photographing lens system. The photographing lens system has a total of five lens elements (110-150) with refractive power. Moreover, there is an air gap between any two of the first lens element 110, the second lens element 120, the third lens element 130, the fourth lens element 140, and the fifth lens element 150 that are adjacent to each other.

The first lens element 110 with negative refractive power has a convex object-side surface 111 and a concave image-side surface 112. The first lens element 110 is made of plastic material and has the object-side surface 111 and the image-side surface 112 being both aspheric.

The second lens element 120 with positive refractive power has a convex object-side surface 121 and a concave image-side surface 122. The second lens element 120 is made of plastic material and has the object-side surface 121 and the image-side surface 122 being both aspheric.

The third lens element 130 with positive refractive power has a convex object-side surface 131 and a convex image-side surface 132. The third lens element 130 is made of plastic material and has the object-side surface 131 and the image-side surface 132 being both aspheric.

The fourth lens element 140 with negative refractive power has a concave object-side surface 141 and a concave image-side surface 142. The third lens element 140 is made of plastic material and has the object-side surface 141 and the image-side surface 142 being both aspheric. Furthermore, the object-side surface 141 of the fourth lens element 140 has at least one inflection point in an off-axial region thereon.

The fifth lens element 150 with positive refractive power has a convex object-side surface 151 and a convex image-side surface 152. The fifth lens element 150 is made of plastic material and has the object-side surface 151 and the image-side surface 152 being both aspheric. Furthermore, the object-side surface 151 of the fifth lens element 150 has at least one inflection point in an off-axial region thereon.

The IR-cut filter 160 and the cover glass 170 are made of glass material and located between the fifth lens element 150 and the image surface 180 in sequence, and will not affect the focal length of the photographing lens system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing lens system of the image capturing device according to the 1st embodiment, when a focal length of the photographing lens system is f, an f-number of the photographing lens system is Fno, and half of a maximal field of view of the photographing lens system is HFOV, these parameters have the following values: f=1.47 mm; Fno=1.95; and HFOV=73.0 degrees.

In the photographing lens system of the image capturing device according to the 1st embodiment, when the maximal field of view of the photographing lens system is FOV, the following condition is satisfied: FOV=146.0 degrees.

In the photographing lens system of the image capturing device according to the 1st embodiment, when a central thickness of the second lens element 120 is CT2, and a sum of central thicknesses of the first lens element 110, the second lens element 120, the third lens element 130, the fourth lens element 140 and the fifth lens element 150 is ΣCT, the following condition is satisfied: ΣCT/CT2=1.85.

In the photographing lens system of the image capturing device according to the 1st embodiment, when a axial distance between the second lens element 120 and the third lens element 130 is T23, and the central thickness of the second lens element 120 is CT2, the following condition is satisfied: T23/CT2=0.06.

In the photographing lens system of the image capturing device according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−0.91.

In the photographing lens system of the image capturing device according to the 1st embodiment, when the focal length of the photographing lens system is f, and a composite focal length of the first lens element 110 and the second lens element 120 is f12, the following condition is satisfied: f/f12=−0.43.

In the photographing lens system of the image capturing device according to the 1st embodiment, when the focal length of the photographing lens system is f, and a focal length of the second lens element 120 is f2, the following condition is satisfied: |f/f2|=0.06.

In the photographing lens system of the image capturing device according to the 1st embodiment, when the focal length of the photographing lens system is f, a curvature radius of the object-side surface 121 of the second lens element 120 is R3, and a curvature radius of the image-side surface 122 of the second lens element 120 is R4, the following condition is satisfied: |f/R3|+|f/R4|=0.28.

In the photographing lens system of the image capturing device according to the 1st embodiment, when a refractive index of the second lens element 120 is N2, and a refractive index of the fourth lens element 140 is N4, the following condition is satisfied: N2+N4=3.25.

In the photographing lens system of the image capturing device according to the 1st embodiment, when the axial distance between the second lens element 120 and the third lens element 130 is T23, and a central thickness of the third lens element 130 is CT3, the following condition is satisfied: T23<CT3.

The detailed optical data of the 1st embodiment are shown in TABLE 1 and the aspheric surface data are shown in TABLE 2 below.

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
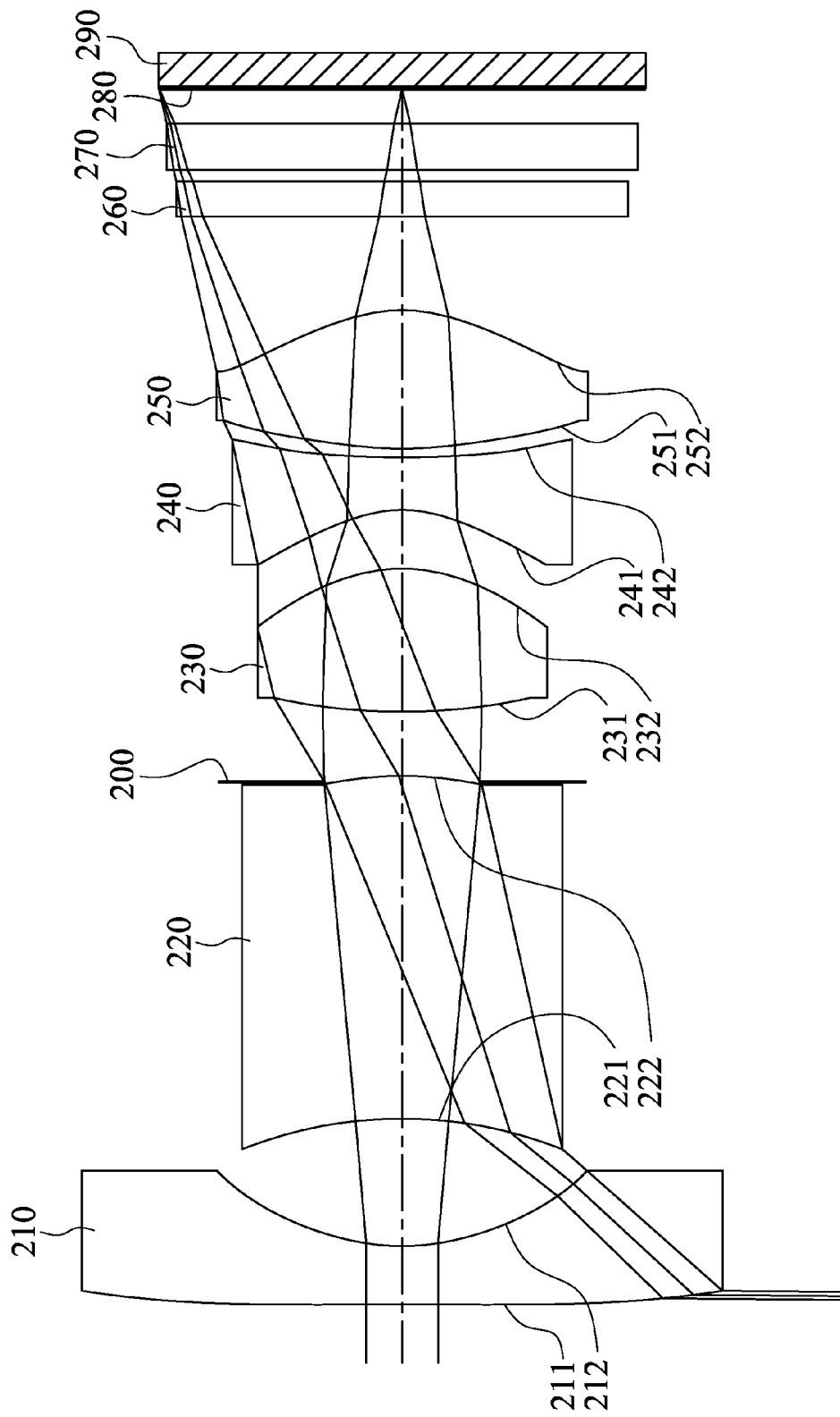
FIG. 3 is a schematic view of an image capturing device according to the 2nd embodiment of the present disclosure.

FIG. 3 is a schematic view of a photographing lens system according to the 2nd embodiment of the present disclosure.

TABLE 1

1st Embodiment
f = 1.47 mm, Fno = 1.95, HFOV = 73.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.722 | ASP | 1.648 | Plastic | 1.544 | 55.9 | −3.15 |
| 2 | | 0.827 | ASP | 2.601 | | | | |
| 3 | Lens 2 | 8.313 | ASP | 4.179 | Plastic | 1.614 | 25.6 | 26.22 |
| 4 | | 13.898 | ASP | 0.554 | | | | |
| 5 | Ape. Stop | Plano | | −0.286 | | | | |
| 6 | Lens 3 | 1.211 | ASP | 0.981 | Plastic | 1.544 | 55.9 | 1.82 |
| 7 | | −3.836 | ASP | 0.196 | | | | |
| 8 | Lens 4 | −1.240 | ASP | 0.300 | Plastic | 1.639 | 23.5 | −1.85 |
| 9 | | 27.050 | ASP | 0.091 | | | | |
| 10 | Lens 5 | 1.688 | ASP | 0.614 | Plastic | 1.544 | 55.9 | 2.63 |
| 11 | | −8.260 | ASP | 0.400 | | | | |
| 12 | IR-cut filter | Plano | | 0.300 | Glass | 1.517 | 64.2 | — |
| 13 | | Plano | | 0.400 | | | | |
| 14 | Cover glass | Plano | | 0.400 | Glass | 1.517 | 64.2 | — |
| 15 | | Plano | | 0.670 | | | | |
| 16 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 3 | 4 | 6 |
| k = | −5.3298E+00 | −1.2039E+00 | 7.1583E+00 | 3.3079E+01 | −5.7537E+00 |
| A4 = | 1.0387E−03 | −2.9927E−02 | −1.3808E−02 | −1.2524E−01 | 2.2124E−01 |
| A6 = | −6.5775E−04 | 5.8237E−02 | 9.7748E−03 | 1.4419E−01 | −1.9519E−01 |
| A8 = | 7.5487E−05 | −3.0809E−02 | −8.2209E−03 | −9.0137E−02 | 1.5700E−01 |
| A10 = | −4.7839E−06 | 8.7686E−03 | 4.0499E−03 | −3.2605E−02 | −2.3295E−02 |
| A12 = | 1.6966E−07 | −1.1341E−03 | −1.1758E−03 | 1.4369E−01 | |
| A14 = | −3.0053E−09 | −1.9023E−07 | 1.7628E−04 | −1.2290E−01 | |
| A16 = | 1.9364E−11 | 8.6514E−06 | −1.0285E−05 | 3.9290E−02 | |

| | Surface # | | | | |
|---|---|---|---|---|---|
| | 7 | 8 | 9 | 10 | 11 |
| k = | −9.9000E+01 | −9.8762E+00 | −9.3597E+01 | −8.4991E+00 | −1.0000E+00 |
| A4 = | −2.1084E−01 | −2.6217E−01 | 4.0932E−02 | −1.3302E−01 | 2.8586E−02 |
| A6 = | −1.7487E−01 | −1.5671E−01 | −4.9628E−01 | 7.8144E−02 | −8.9679E−02 |
| A8 = | 2.0081E+00 | 2.3428E+00 | 2.3792E+00 | 3.8457E−04 | 6.1707E−02 |
| A10 = | −6.2547E+00 | −5.8549E+00 | −4.6563E+00 | −8.3491E−02 | −3.1712E−02 |
| A12 = | 1.0586E+01 | 7.0660E+00 | 4.8377E+00 | 1.5458E−02 | −3.7715E−03 |
| A14 = | −9.1851E+00 | −3.9690E+00 | −2.6395E+00 | 6.6471E−03 | 5.3354E−03 |
| A16 = | 3.3022E+00 | 7.7188E−01 | 6.1021E−01 | −2.8916E−03 | −9.4193E−04 |

Figure 4:
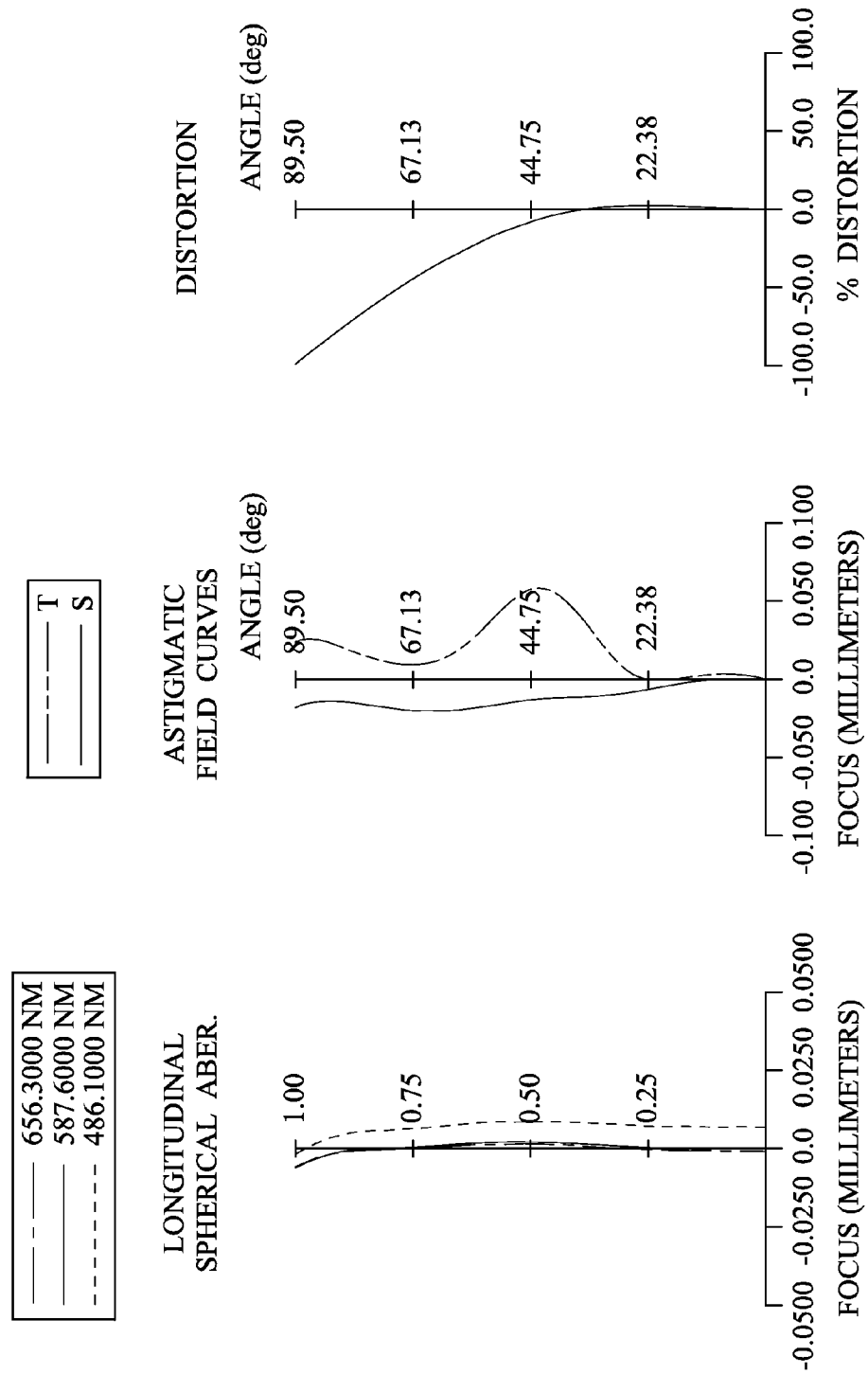
FIG. 4 shows spherical aberration curves, astigmatic field curves and a distortion curve of the image capturing device according to the 2nd embodiment.

FIG. 4 shows, in order from left to right, spherical aberration curves, astigmatic field curves and a distortion curve of the photographing lens system according to the 2nd embodiment.

In FIG. 3, the image capturing device includes the photographing lens system (its reference numeral is omitted) of the present disclosure and an image sensor 290. The photographing lens system includes, in order from an object side to an image side, a first lens element 210, a second lens element 220, an aperture stop 200, a third lens element 230, a fourth lens element 240, a fifth lens element 250, an IR-cut filter 260, a cover glass 270 and an image surface 280. The image sensor 290 is disposed on the image surface 280 of the photographing lens system. The photographing lens system has a total of five lens elements (210-250) with refractive power. Moreover, there is an air gap between any two of the first lens element 210, the second lens element 220, the third lens element 230, the fourth lens element 240, and the fifth lens element 250 that are adjacent to each other.

The first lens element 210 with negative refractive power has a concave object-side surface 211 and a concave image-side surface 212. The first lens element 210 is made of plastic material and has the object-side surface 211 and the image-side surface 212 being both aspheric.

The second lens element 220 with positive refractive power has a concave object-side surface 221 and a convex image-side surface 222. The second lens element 220 is made of glass material and has the object-side surface 221 and the image-side surface 222 being both aspheric.

The third lens element 230 with positive refractive power has a convex object-side surface 231 and a convex image-side surface 232. The third lens element 230 is made of plastic material and has the object-side surface 231 and the image-side surface 232 being both aspheric.

The fourth lens element 240 with negative refractive power has a concave object-side surface 241 and a concave image-side surface 242. The fourth lens element 240 is made of plastic material and has the object-side surface 241 and the image-side surface 242 being both aspheric. Furthermore, both of the object-side surface 241 and the image-side surface 242 of the fourth lens element 240 have at least one inflection point in an off-axial region thereon.

The fifth lens element 250 with positive refractive power has a convex object-side surface 251 and a convex image-side surface 252. The fifth lens element 250 is made of plastic material and has the object-side surface 251 and the image-side surface 252 being both aspheric. Furthermore, the image-side surface 252 of the fifth lens element 250 has at least one inflection point in an off-axial region thereon.

The IR-cut filter 260 and the cover glass 270 are made of glass material and located between the fifth lens element 250 and the image surface 280 in sequence, and will not affect the focal length of the photographing lens system.

The detailed optical data of the 2nd embodiment are shown in TABLE 3 and the aspheric surface data are shown in TABLE 4 below.

TABLE 3

2nd Embodiment
f = 1.35 mm, Fno = 2.20, HFOV = 89.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −100.000 | ASP | 0.500 | Plastic | 1.544 | 55.9 | −3.49 |
| 2 | | 1.939 | ASP | 1.089 | | | | |
| 3 | Lens 2 | −4.254 | ASP | 2.936 | Glass | 1.714 | 38.9 | 6.49 |
| 4 | | −2.856 | ASP | −0.050 | | | | |
| 5 | Ape. Stop | Plano | | 0.599 | | | | |
| 6 | Lens 3 | 6.111 | ASP | 1.226 | Plastic | 1.544 | 55.9 | 2.19 |
| 7 | | −1.377 | ASP | 0.501 | | | | |
| 8 | Lens 4 | −1.099 | ASP | 0.450 | Plastic | 1.650 | 21.5 | −1.45 |
| 9 | | 7.755 | ASP | 0.075 | | | | |
| 10 | Lens 5 | 3.215 | ASP | 1.184 | Plastic | 1.535 | 55.7 | 1.97 |
| 11 | | −1.369 | ASP | 0.800 | | | | |
| 12 | IR-cut filter | Plano | | 0.300 | Glass | 1.517 | 64.2 | — |
| 13 | | Plano | | 0.100 | | | | |
| 14 | Cover glass | Plano | | 0.400 | Glass | 1.517 | 64.2 | — |
| 15 | | Plano | | 0.301 | | | | |
| 16 | Image | Plano | | — | | | | |

Note:
Reference wavelength is 587.6 nm (d-line).

TABLE 4

Aspheric Coefficients

| | Surface # | | | | |
|---|---|---|---|---|---|
| | 1 | 2 | 3 | 4 | 6 |
| k = | 9.0000E+00 | −8.0589E−01 | 3.6697E−01 | 7.1427E+00 | 1.2810E+01 |
| A4 = | 3.9066E−03 | −3.7492E−02 | −3.4525E−02 | 8.0776E−02 | 3.1306E−02 |
| A6 = | −1.5529E−04 | 2.0396E−02 | 2.9064E−02 | 3.7931E−02 | −2.7695E−02 |
| A8 = | 2.1172E−07 | −5.4135E−03 | −1.3173E−02 | −1.4899E−01 | −9.2393E−03 |
| A10 = | | 1.0659E−03 | 2.9359E−03 | 5.3167E−01 | 1.7239E−02 |
| A12 = | | | 2.3940E−05 | −7.3791E−01 | −4.6550E−03 |
| A14 = | | | −8.4204E−05 | 4.1420E−01 | |

TABLE 4-continued

Aspheric Coefficients

| Surface # | 7 | 8 | 9 | 10 | 11 |
|---|---|---|---|---|---|
| k = | −3.9489E−01 | −7.1228E−01 | 2.2002E+01 | −1.4443E+01 | −4.1933E+00 |
| A4 = | 9.1365E−02 | 2.0801E−01 | −3.3954E−02 | −2.5009E−02 | −4.7133E−02 |
| A6 = | −3.2997E−02 | −6.1516E−02 | 4.2078E−02 | 1.5052E−02 | 7.0140E−02 |
| A8 = | 6.4902E−03 | −7.5331E−03 | −1.4912E−02 | −6.8440E−03 | −5.0160E−02 |
| A10 = | −2.8234E−03 | 9.2596E−03 | 3.5871E−04 | 5.5215E−03 | 1.7069E−02 |
| A12 = | 3.0083E−03 | −2.1497E−17 | −1.9898E−17 | −1.9265E−03 | −2.3154E−03 |
| A14 = | | | | 2.0561E−04 | 1.3979E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 1.35 | (R7 + R8)/(R7 − R8) | −0.75 |
| Fno | 2.20 | f/f12 | 0.05 |
| HFOV (deg.) | 89.5 | |f/f2| | 0.21 |
| FOV (deg.) | 179.0 | |f/R3| + |f/R4| | 0.79 |
| ΣCT/CT2 | 2.14 | N2 + N4 | 3.36 |
| T23/CT2 | 0.19 | | |

Furthermore, in the photographing lens system of the image capturing device according to the 2rd embodiment, when the axial distance between the second lens element 220 and the third lens element 230 is T23, and a central thickness of the third lens element 230 is CT3, the following condition is satisfied: T23<CT3.

3rd Embodiment

Figure 5:
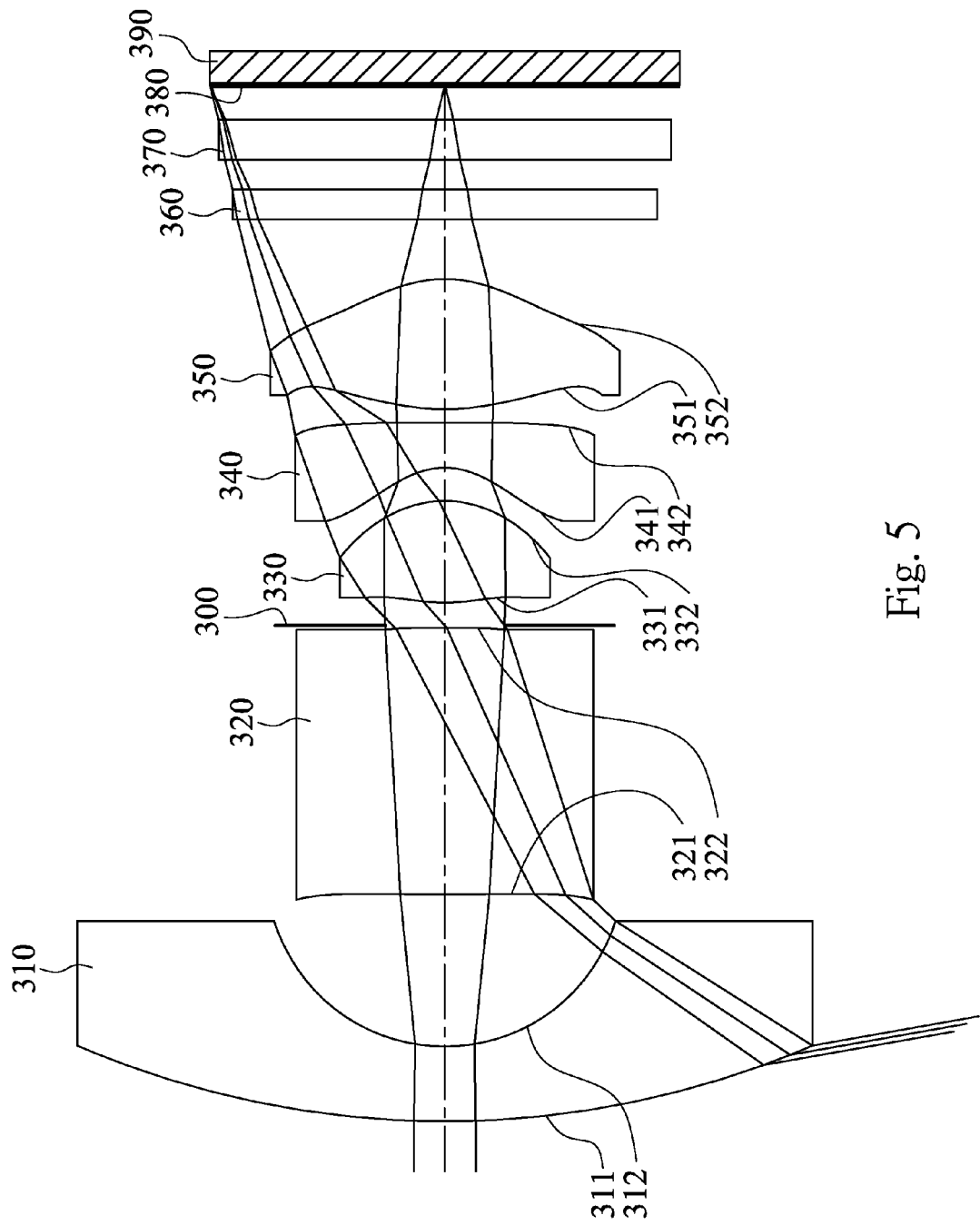
FIG. 5 is a schematic view of an image capturing device according to the 3rd embodiment of the present disclosure.
Figure 6:
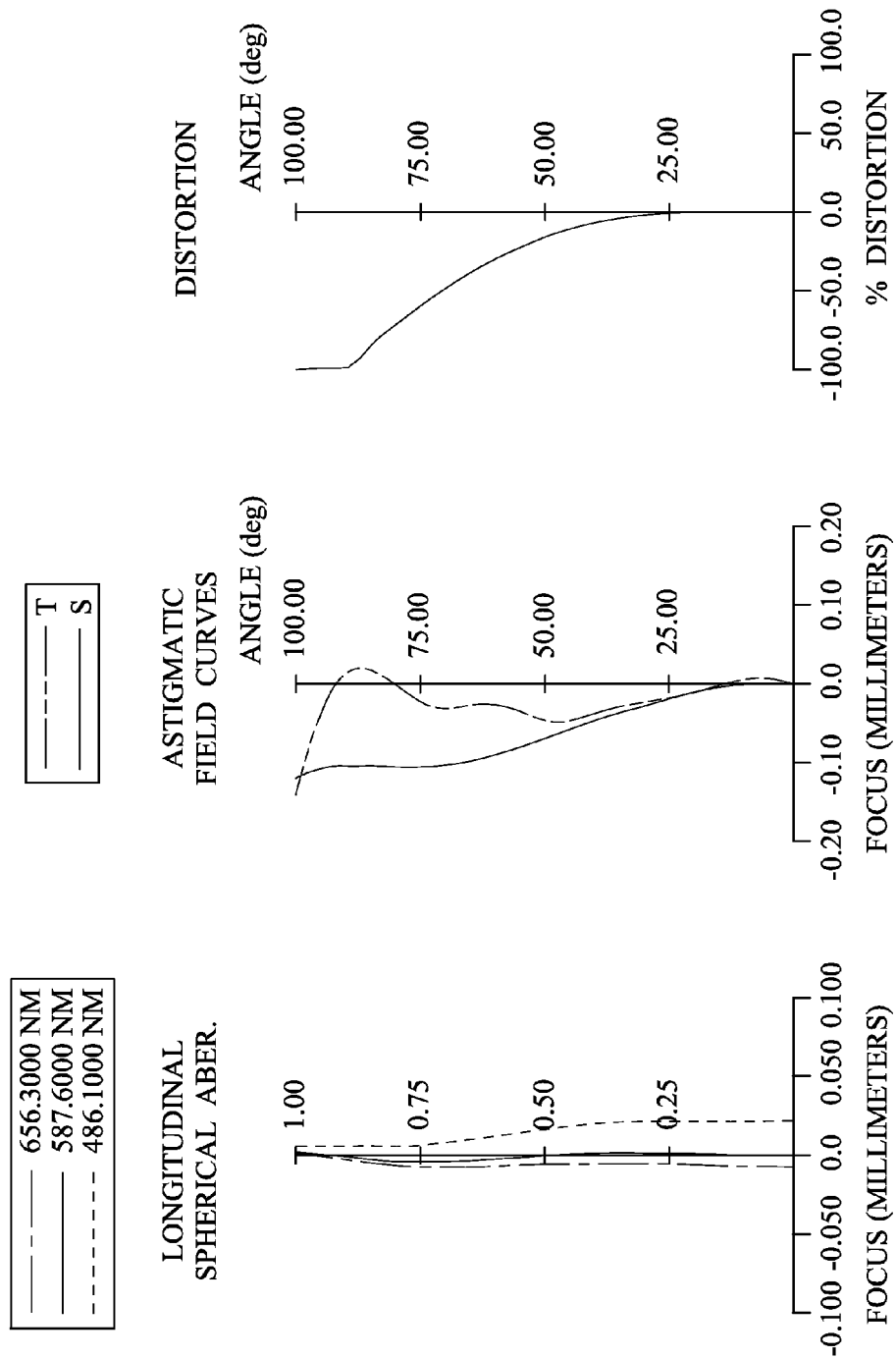
FIG. 6 shows spherical aberration curves, astigmatic field curves and a distortion curve of the image capturing device according to the 3rd embodiment.

FIG. 5 is a schematic view of a photographing lens system according to the 3rd embodiment of the present disclosure. FIG. 6 shows, in order from left to right, spherical aberration curves, astigmatic field curves and a distortion curve of the photographing lens system according to the 3rd embodiment.

In FIG. 5, the image capturing device includes the photographing lens system (its reference numeral is omitted) of the present disclosure and an image sensor 390. The photographing lens system includes, in order from an object side to an image side, a first lens element 310, a second lens element 320, an aperture stop 300, a third lens element 330, a fourth lens element 340, a fifth lens element 350, an IR-cut filter 360, a cover glass 370 and an image surface 380. The image sensor 390 is disposed on the image surface 380 of the photographing lens system. The photographing lens system has a total of five lens elements (310-350) with refractive power. Moreover, there is an air gap between any two of the first lens element 310, the second lens element 320, the third lens element 330, the fourth lens element 340, and the fifth lens element 350 that are adjacent to each other.

The first lens element 310 with negative refractive power has a convex object-side surface 311 and a concave image-side surface 312. The first lens element 310 is made of glass material and has the object-side surface 311 and the image-side surface 312 being both spherical.

The second lens element 320 with positive refractive power has a convex object-side surface 321 and a convex image-side surface 322. The second lens element 320 is made of plastic material and has the object-side surface 321 and the image-side surface 322 being both aspheric.

The third lens element 330 with positive refractive power has a convex object-side surface 331 and a convex image-side surface 332. The third lens element 330 is made of plastic material and has the object-side surface 131 and the image-side surface 332 being both aspheric.

The fourth lens element 340 with negative refractive power has a concave object-side surface 341 and a concave image-side surface 342. The fourth lens element 340 is made of plastic material and has the object-side surface 341 and the image-side surface 342 being both aspheric. Furthermore, both of the object-side surface 341 and the image-side surface 342 of the fourth lens element 340 have at least one inflection point in an off-axial region thereon.

The fifth lens element 350 with positive refractive power has a convex object-side surface 351 and a convex image-side surface 352. The fifth lens element 350 is made of plastic material and has the object-side surface 351 and the image-side surface 352 being both aspheric. Furthermore, both of the object-side surface 351 and the image-side surface 352 of the fifth lens element 350 have at least one inflection point in an off-axial region thereon.

The IR-cut filter 360 and the cover glass 370 are made of glass material and located between the fifth lens element 350 and the image surface 380 in sequence, and will not affect the focal length of the photographing lens system. The detailed optical data of the 3rd embodiment are shown in TABLE 5 and the aspheric surface data are shown in TABLE 6 below.

TABLE 5

3rd Embodiment
f = 1.28 mm, Fno = 2.07, HFOV = 100.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.331 | 0.750 | Glass | 1.723 | 38.0 | −3.20 |
| 2 | | 1.793 | 1.529 | | | | |

TABLE 5-continued

3rd Embodiment
f = 1.28 mm, Fno = 2.07, HFOV = 100.0 deg.

| Surface # | | Curvature Radius | | Thickness | Material | Index | Abbe # | Focal Length |
|---|---|---|---|---|---|---|---|---|
| 3 | Lens 2 | 54.364 | ASP | 2.678 | Plastic | 1.639 | 23.5 | 44.59 |
| 4 | | −58.713 | ASP | 0.020 | | | | |
| 5 | Ape. Stop | Plano | | 0.234 | | | | |
| 6 | Lens 3 | 2.091 | ASP | 1.020 | Plastic | 1.535 | 55.7 | 1.50 |
| 7 | | −1.086 | ASP | 0.333 | | | | |
| 8 | Lens 4 | −0.727 | ASP | 0.450 | Plastic | 1.639 | 23.5 | −1.12 |
| 9 | | 58.221 | ASP | 0.137 | | | | |
| 10 | Lens 5 | 2.190 | ASP | 1.308 | Plastic | 1.535 | 55.7 | 1.72 |
| 11 | | −1.259 | ASP | 0.600 | | | | |
| 12 | IR-cut filter | Plano | | 0.300 | Glass | 1.517 | 64.2 | — |
| 13 | | Plano | | 0.300 | | | | |
| 14 | Cover glass | Plano | | 0.400 | Glass | 1.517 | 64.2 | — |
| 15 | | Plano | | 0.346 | | | | |
| 16 | Image | Plano | | — | | | | |

Note 1:
Reference wavelength is 587.6 nm (d-line).
Note 2:
Effective radius of Surface 9 is 1.500 mm.

TABLE 6

Aspheric Coefficients

| Surface # | 3 | 4 | 6 | 7 |
|---|---|---|---|---|
| k = | −9.9000E+01 | 1.0114E+01 | −2.8691E+00 | −6.3741E−01 |
| A4 = | 1.0707E−02 | −1.6994E−01 | −2.3801E−01 | 1.4606E−02 |
| A6 = | −2.6203E−02 | 1.6934E−01 | 1.6571E−01 | 4.3584E−02 |
| A8 = | 1.5340E−02 | −1.7967E−01 | −4.4708E−01 | −1.2842E−01 |
| A10 = | −6.9839E−03 | 1.4466E−01 | 2.7823E−01 | 6.4993E−02 |
| A12 = | 1.7455E−03 | 1.3152E−04 | 1.9438E−18 | 1.9428E−18 |
| A14 = | −1.7135E−04 | 8.2236E−05 | | |

| Surface # | 8 | 9 | 10 | 11 |
|---|---|---|---|---|
| k = | −8.7595E−01 | 9.9000E+01 | −5.7412E+00 | −4.6789E+00 |
| A4 = | 2.4428E−01 | −3.3954E−02 | −7.5569E−02 | −1.2640E−01 |
| A6 = | 8.0896E−03 | 1.2094E−02 | 1.2814E−01 | 1.6777E−01 |
| A8 = | 3.3224E−02 | −3.6237E−04 | −1.2900E−01 | −9.6639E−02 |
| A10 = | −1.9526E−02 | −1.7578E−03 | 7.4575E−02 | 3.4143E−02 |
| A12 = | 1.8809E−18 | 3.5050E−18 | −2.4451E−02 | −8.0794E−03 |
| A14 = | | | 3.1759E−03 | 8.9063E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

3rd Embodiment

| f (mm) | 1.28 | (R7 + R8)/(R7 − R8) | −0.98 |
|---|---|---|---|
| Fno | 2.07 | f/f12 | −0.35 |
| HFOV (deg.) | 100.0 | |f/f2| | 0.03 |
| FOV (deg.) | 200.0 | |f/R3| + |f/R4| | 0.05 |
| ΣCT/CT2 | 2.32 | N2 + N4 | 3.28 |
| T23/CT2 | 0.09 | | |

Furthermore, in the photographing lens system of the image capturing device according to the 3rd embodiment, when the axial distance between the second lens element 320 and the third lens element 330 is T23, and a central thickness of the third lens element 330 is CT3, the following condition is satisfied: T23<CT3.

4th Embodiment

Figure 7:
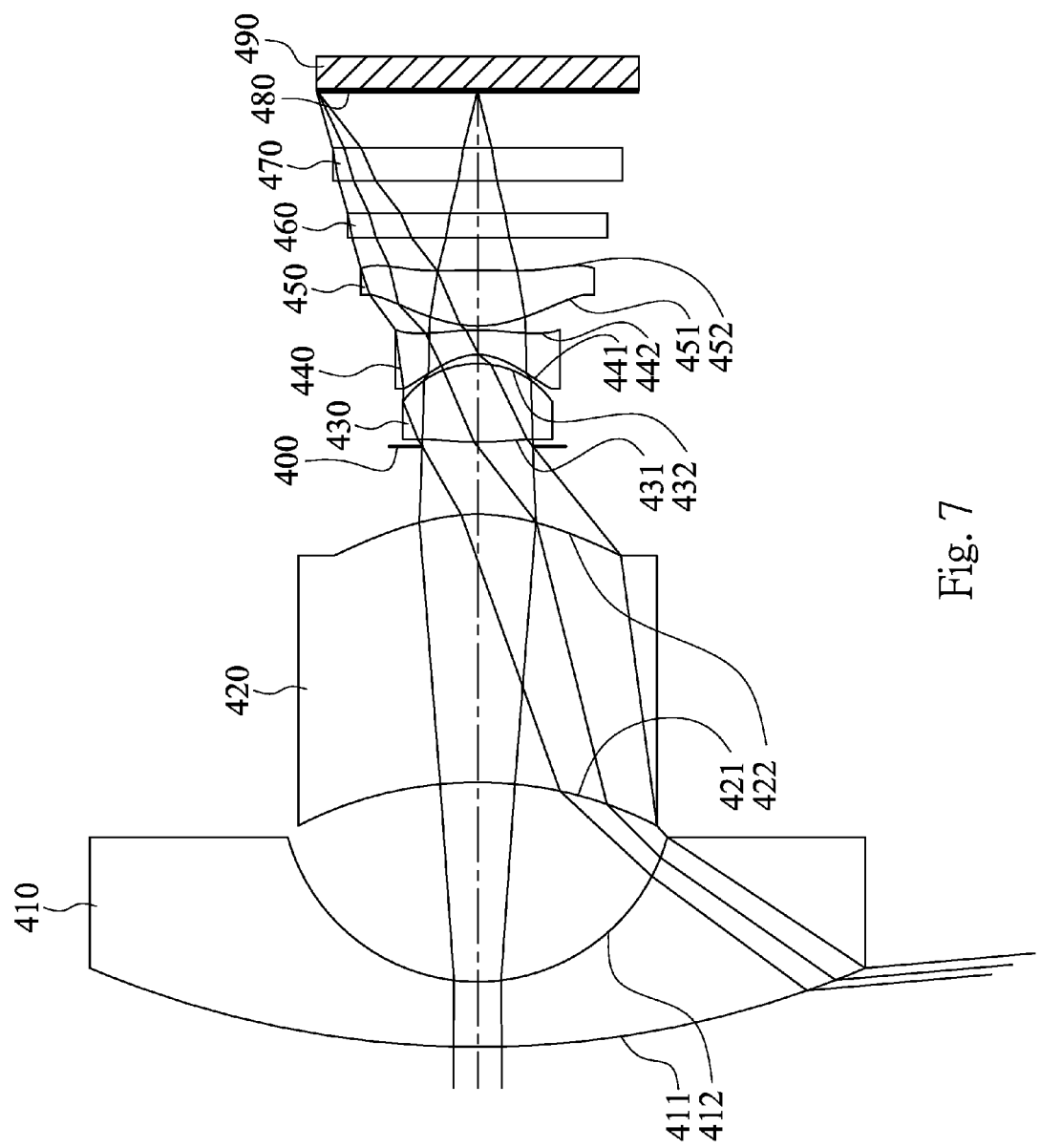
FIG. 7 is a schematic view of an image capturing device according to the 4th embodiment of the present disclosure.
Figure 8:
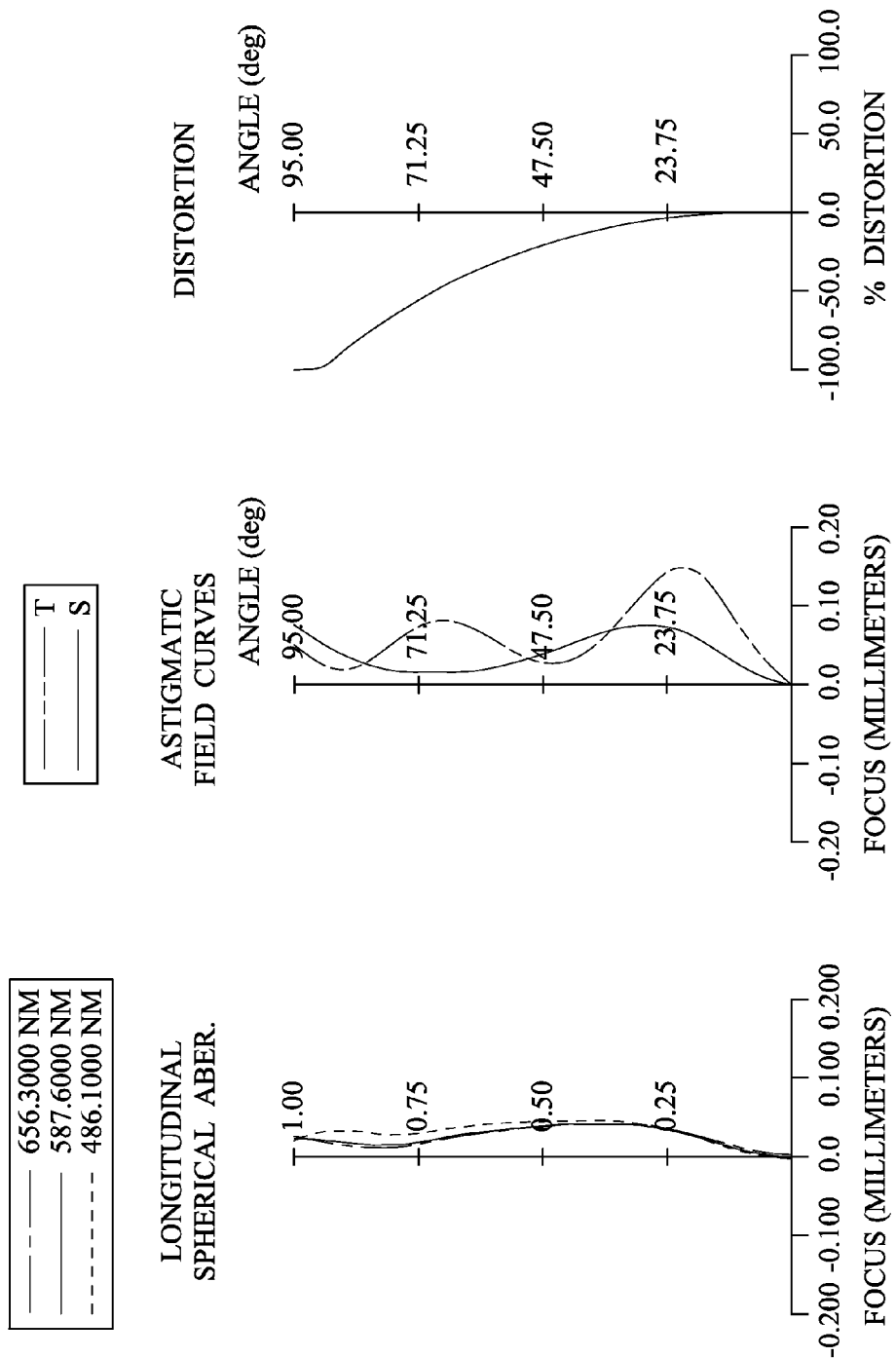
FIG. 8 shows spherical aberration curves, astigmatic field curves and a distortion curve of the image capturing device according to the 4th embodiment.

FIG. 7 is a schematic view of a photographing lens system according to the 4th embodiment of the present disclosure. FIG. 8 shows, in order from left to right, spherical aberration curves, astigmatic field curves and a distortion curve of the photographing lens system according to the 4th embodiment.

In FIG. 7, the image capturing device includes the photographing lens system (its reference numeral is omitted) of the present disclosure and an image sensor 490. The photographing lens system includes, in order from an object side to an image side, a first lens element 410, a second lens element 420, an aperture stop 400, a third lens element 430, a fourth lens element 440, a fifth lens element 450, an IR-cut filter 460, a cover glass 470 and an image surface 480. The image sensor 490 is disposed on the image surface 480 of the photographing lens system. The photographing lens system has a total of five lens elements (410-450) with refractive power. Moreover, there is an air gap between any two of the first lens element 410, the second lens element 420, the third lens element 430, the fourth lens element 440, and the fifth lens element 450 that are adjacent to each other.

The first lens element 410 with negative refractive power has a convex object-side surface 411 and a concave image-side surface 412. The first lens element 410 is made of glass material and has the object-side surface 411 and the image-side surface 412 being both spherical.

The second lens element 420 with positive refractive power has a concave object-side surface 421 and a convex image-side surface 422. The second lens element 420 is made of plastic material and has the object-side surface 421 and the image-side surface 422 being both aspheric.

The third lens element 430 with positive refractive power has a convex object-side surface 431 and a convex image-side surface 432. The third lens element 430 is made of plastic material and has the object-side surface 431 and the image-side surface 432 being both aspheric.

The fourth lens element 440 with negative refractive power has a concave object-side surface 441 and a convex image-side surface 442. The fourth lens element 440 is made of plastic material and has the object-side surface 441 and the image-side surface 442 being both aspheric. Furthermore, both of the object-side surface 441 and the image-side surface 442 of the fourth lens element 440 have at least one inflection point in an off-axial region thereon.

The fifth lens element 450 with positive refractive power has a convex object-side surface 451 and a convex image-side surface 452. The fifth lens element 450 is made of plastic material and has the object-side surface 451 and the image-side surface 452 being both aspheric. Furthermore, both of the object-side surface 451 and the image-side surface 452 of the fifth lens element 450 have at least one inflection point in an off-axial region thereon.

The IR-cut filter 460 and the cover glass 470 are made of glass material and located between the fifth lens element 450 and the image surface 480 in sequence, and will not affect the focal length of the photographing lens system.

The detailed optical data of the 4th embodiment are shown in TABLE 7 and the aspheric surface data are shown in TABLE 8 below.

TABLE 7

4th Embodiment
f = 1.20 mm, Fno = 2.02, HFOV = 95.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.169 | 0.800 | Glass | 1.724 | 38.1 | −4.31 |
| 2 | | 2.414 | 2.449 | | | | |
| 3 | Lens 2 | −4.754 ASP | 3.292 | Plastic | 1.639 | 23.5 | 4.76 |
| 4 | | −2.356 ASP | 0.833 | | | | |
| 5 | Ape. Stop | Plano | 0.056 | | | | |
| 6 | Lens 3 | 5.866 ASP | 0.960 | Plastic | 1.544 | 55.9 | 1.98 |
| 7 | | −1.242 ASP | 0.112 | | | | |
| 8 | Lens 4 | −0.618 ASP | 0.300 | Plastic | 1.639 | 23.5 | −1.39 |
| 9 | | −2.407 ASP | 0.050 | | | | |
| 10 | Lens 5 | 1.300 ASP | 0.685 | Plastic | 1.544 | 55.9 | 2.12 |
| 11 | | −8.297 ASP | 0.400 | | | | |
| 12 | IR-cut filter | Plano | 0.300 | Glass | 1.517 | 64.2 | — |
| 13 | | Plano | 0.400 | | | | |
| 14 | Cover glass | Plano | 0.400 | Glass | 1.517 | 64.2 | — |
| 15 | | Plano | 0.704 | | | | |
| 16 | Image | Plano | — | | | | |

Note:
Reference wave ength is 587.6 nm (d-line).

TABLE 8

Aspheric Coefficients

| Surface # | 3 | 4 | 6 | 7 |
|---|---|---|---|---|
| k = | −3.9453E−01 | −6.3682E+00 | −9.9000E+01 | −1.8708E+00 |
| A4 = | 3.8865E−03 | −1.5376E−02 | 1.4428E−01 | −3.0455E−01 |
| A6 = | −2.0000E−03 | 4.2303E−03 | −4.5306E−01 | 3.1152E−01 |
| A8 = | 3.0913E−04 | −6.9971E−04 | 9.9742E−01 | −3.0580E−01 |
| A10 = | −1.5003E−05 | 5.4637E−05 | −1.3072E+00 | 4.5835E−02 |

| Surface # | 8 | 9 | 10 | 11 |
|---|---|---|---|---|
| k = | −3.5947E+00 | −9.9000E+01 | −4.8487E+00 | 2.6476E+01 |
| A4 = | −4.0794E−01 | 2.0053E−03 | −5.1443E−03 | 1.7479E−01 |
| A6 = | 8.3902E−01 | 9.2919E−02 | 4.3992E−02 | −7.2649E−02 |
| A8 = | −8.7187E−01 | −3.5895E−02 | −3.9990E−02 | 2.6162E−03 |
| A10 = | 4.2659E−01 | 2.3411E−02 | 7.6013E−03 | 1.0901E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 1.20 | (R7 + R8)/(R7 − R8) | −1.69 |
| Fno | 2.02 | f/f12 | 0.26 |
| HFOV (deg.) | 95.0 | |f/f2| | 0.25 |
| FOV (deg.) | 190.0 | |f/R3| + |f/R4| | 0.76 |
| ΣCT/CT2 | 1.83 | N2 + N4 | 3.28 |
| T23/CT2 | 0.27 | | |

Furthermore, in the photographing lens system of the image capturing device according to the 4th embodiment, when the axial distance between the second lens element 420 and the third lens element 430 is T23, and a central thickness of the third lens element 430 is CT3, the following condition is satisfied: T23<CT3.

5th Embodiment

Figure 9:
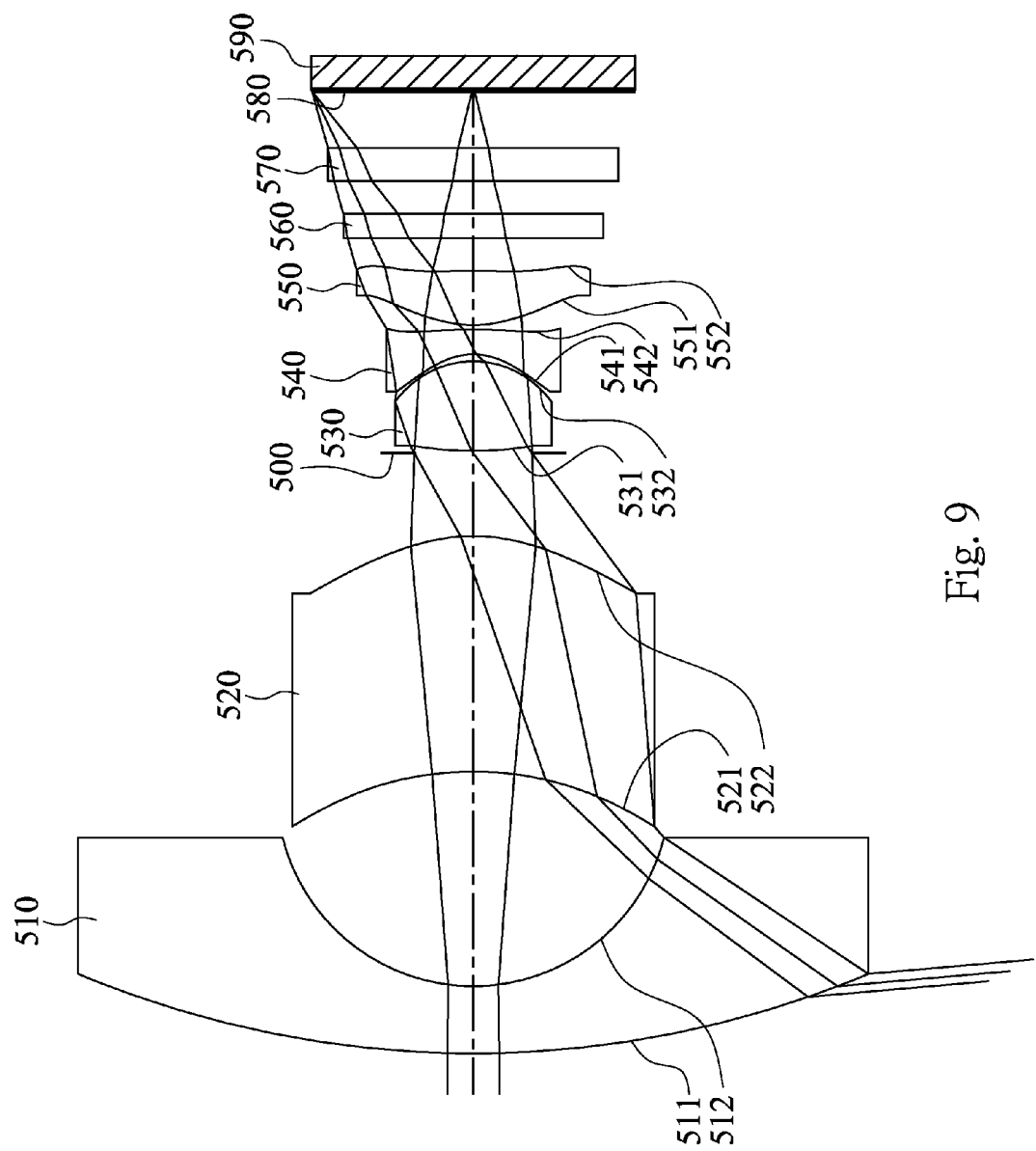
FIG. 9 is a schematic view of an image capturing device according to the 5th embodiment of the present disclosure.
Figure 10:
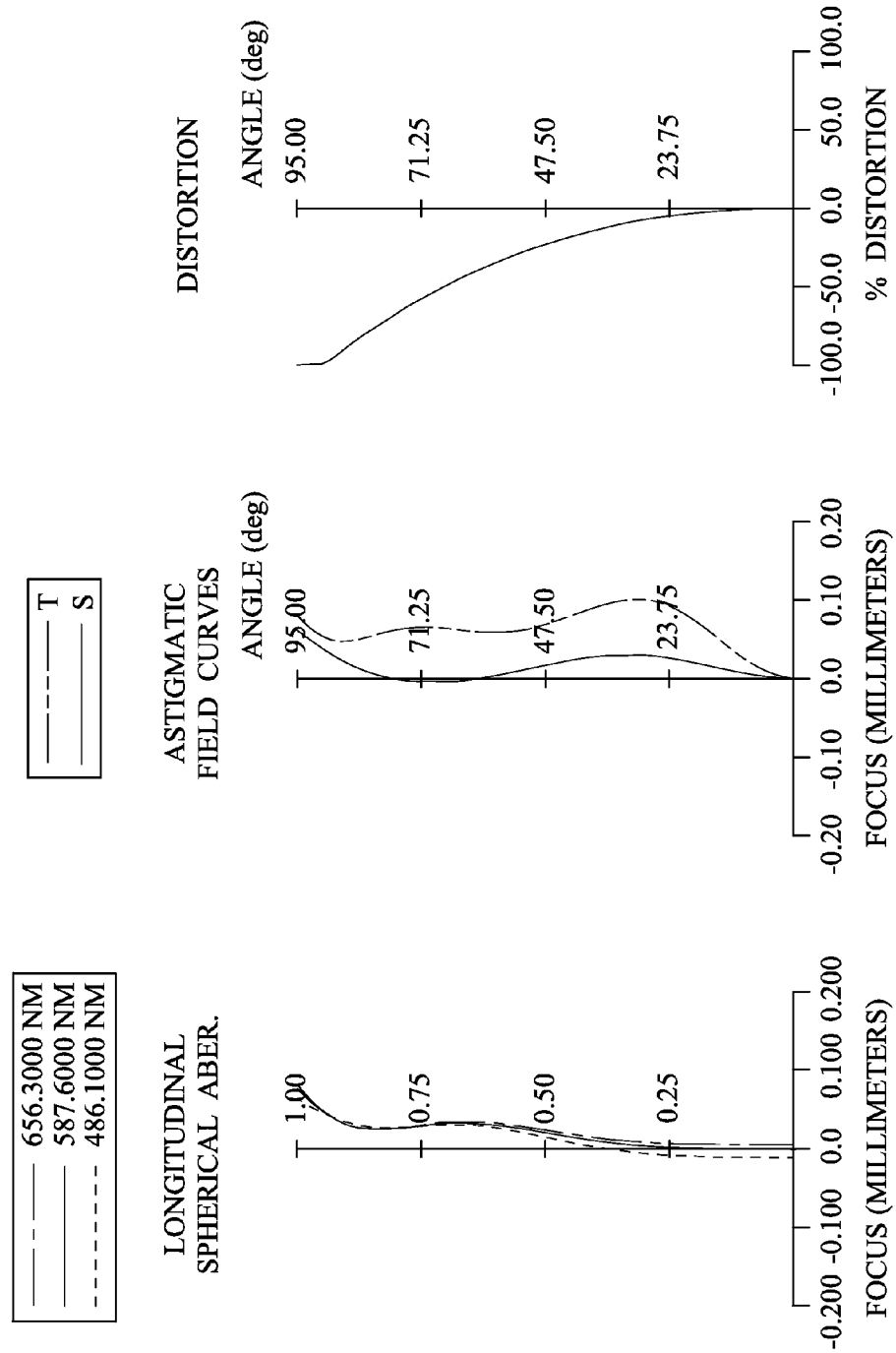
FIG. 10 shows spherical aberration curves, astigmatic field curves and a distortion curve of the image capturing device according to the 5th embodiment.

FIG. 9 is a schematic view of a photographing lens system according to the 5th embodiment of the present disclosure. FIG. 10 shows, in order from left to right, spherical aberration curves, astigmatic field curves and a distortion curve of the photographing lens system according to the 5th embodiment.

In FIG. 9, the image capturing device includes the photographing lens system (its reference numeral is omitted) of the present disclosure and an image sensor 590. The photographing lens system includes, in order from an object side to an image side, a first lens element 510, a second lens element 520, an aperture stop 500, a third lens element 530, a fourth lens element 540, a fifth lens element 550, an IR-cut filter 560, a cover glass 570 and an image surface 580. The image sensor 590 is disposed on the image surface 580 of the photographing lens system. The photographing lens system has a total of five lens elements (510-550) with refractive power. Moreover, there is an air gap between any two of the first lens element 510, the second lens element 520, the third lens element 530, the fourth lens element 540, and the fifth lens element 550 that are adjacent to each other.

The first lens element 510 with negative refractive power has a convex object-side surface 511 and a concave image-side surface 512. The first lens element 510 is made of glass material and has the object-side surface 511 and the image-side surface 512 being both spherical.

The second lens element 520 with positive refractive power has a concave object-side surface 521 and a convex image-side surface 522. The second lens element 520 is made of plastic material and has the object-side surface 521 and the image-side surface 522 being both aspheric.

The third lens element 530 with positive refractive power has a convex object-side surface 531 and a convex image-side surface 532. The third lens element 530 is made of plastic material and has the object-side surface 531 and the image-side surface 532 being both aspheric.

The fourth lens element 540 with negative refractive power has a concave object-side surface 541 and a convex image-side surface 542. The fourth lens element 540 is made of plastic material and has the object-side surface 541 and the image-side surface 542 being both aspheric. Furthermore, both of the object-side surface 541 and the image-side surface 542 of the fourth lens element 540 have at least one inflection point in an off-axial region thereon.

The fifth lens element 550 with positive refractive power has a convex object-side surface 551 and a convex image-side surface 552. The fifth lens element 550 is made of plastic material and has the object-side surface 551 and the image-side surface 552 being both aspheric. Furthermore, both of the object-side surface 551 and the image-side surface 552 of the fifth lens element 550 have at least one inflection point in an off-axial region thereon.

The IR-cut filter 560 and the cover glass 570 are made of glass material and located between the fifth lens element 550 and the image surface 580 in sequence, and will not affect the focal length of the photographing lens system.

The detailed optical data of the 5th embodiment are shown in TABLE 9 and the aspheric surface data are shown in TABLE 10 below.

TABLE 10

Aspheric Coefficients

| Surface # | 3 | 4 | 6 | 7 |
|---|---|---|---|---|
| k = | 1.6090E+00 | −3.8201E+00 | −9.9000E+01 | −5.2340E−01 |
| A4 = | −1.2004E−03 | −5.7971E−03 | 2.0309E−01 | −4.0463E−01 |
| A6 = | 7.5359E−04 | −3.8271E−05 | −4.8387E−01 | 8.0705E−01 |
| A8 = | −3.7309E−05 | 2.4154E−04 | 9.4802E−01 | −8.1417E−01 |
| A10 = | 2.4985E−05 | −2.6949E−05 | −9.3538E−01 | 2.6441E−01 |

| Surface # | 8 | 9 | 10 | 11 |
|---|---|---|---|---|
| k = | −1.4065E+00 | 5.4804E+01 | −8.6696E+00 | −3.8000E+02 |
| A4 = | −2.0144E−01 | −3.3429E−02 | 8.8818E−02 | 1.0727E−01 |
| A6 = | 7.9277E−01 | 2.1861E−01 | −5.6577E−02 | −2.8977E−02 |
| A8 = | −1.0060E+00 | −1.8989E−01 | 2.3368E−02 | −7.3082E−03 |
| A10 = | 4.7489E−01 | 8.3201E−02 | −9.6770E−03 | −1.2226E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

5th Embodiment

| f (mm) | 1.28 | (R7 + R8)/(R7 − R8) | −1.21 |
|---|---|---|---|
| Fno | 2.02 | f/f12 | 0.28 |
| HFOV (deg.) | 95.0 | \|f/f2\| | 0.27 |
| FOV (deg.) | 190.0 | \|f/R3\| + \|f/R4\| | 0.90 |
| ΣCT/CT2 | 2.00 | N2 + N4 | 3.23 |
| T23/CT2 | 0.36 | | |

Furthermore, in the photographing lens system of the image capturing device according to the 5th embodiment, when the axial distance between the second lens element 520 and the third lens element 530 is T23, and a central thickness of the third lens element 530 is CT3, the following condition is satisfied: T23<CT3.

TABLE 9

5th Embodiment
f = 1.28 mm, Fno = 2.02, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.468 | | 0.820 | Glass | 1.724 | 38.1 | −4.25 |
| 2 | | 2.400 | | 2.621 | | | | |
| 3 | Lens 2 | −4.155 | ASP | 2.879 | Plastic | 1.614 | 25.6 | 4.79 |
| 4 | | −2.176 | ASP | 1.009 | | | | |
| 5 | Ape. Stop | Plano | | 0.030 | | | | |
| 6 | Lens 3 | 4.844 | ASP | 1.093 | Plastic | 1.514 | 56.8 | 2.14 |
| 7 | | −1.311 | ASP | 0.087 | | | | |
| 8 | Lens 4 | −0.804 | ASP | 0.300 | Plastic | 1.614 | 25.6 | −1.47 |
| 9 | | −8.442 | ASP | 0.055 | | | | |
| 10 | Lens 5 | 1.348 | ASP | 0.663 | Plastic | 1.535 | 55.7 | 2.20 |
| 11 | | −7.757 | ASP | 0.400 | | | | |
| 12 | IR-cut filter | Plano | | 0.300 | Glass | 1.517 | 64.2 | — |
| 13 | | Plano | | 0.400 | | | | |
| 14 | Cover glass | Plano | | 0.400 | Glass | 1.517 | 64.2 | — |
| 15 | | Plano | | 0.706 | | | | |
| 16 | Image | Plano | | — | | | | |

Note:
Reference wavelength is 587.6 nm (d-line).

6th Embodiment

Figure 11:
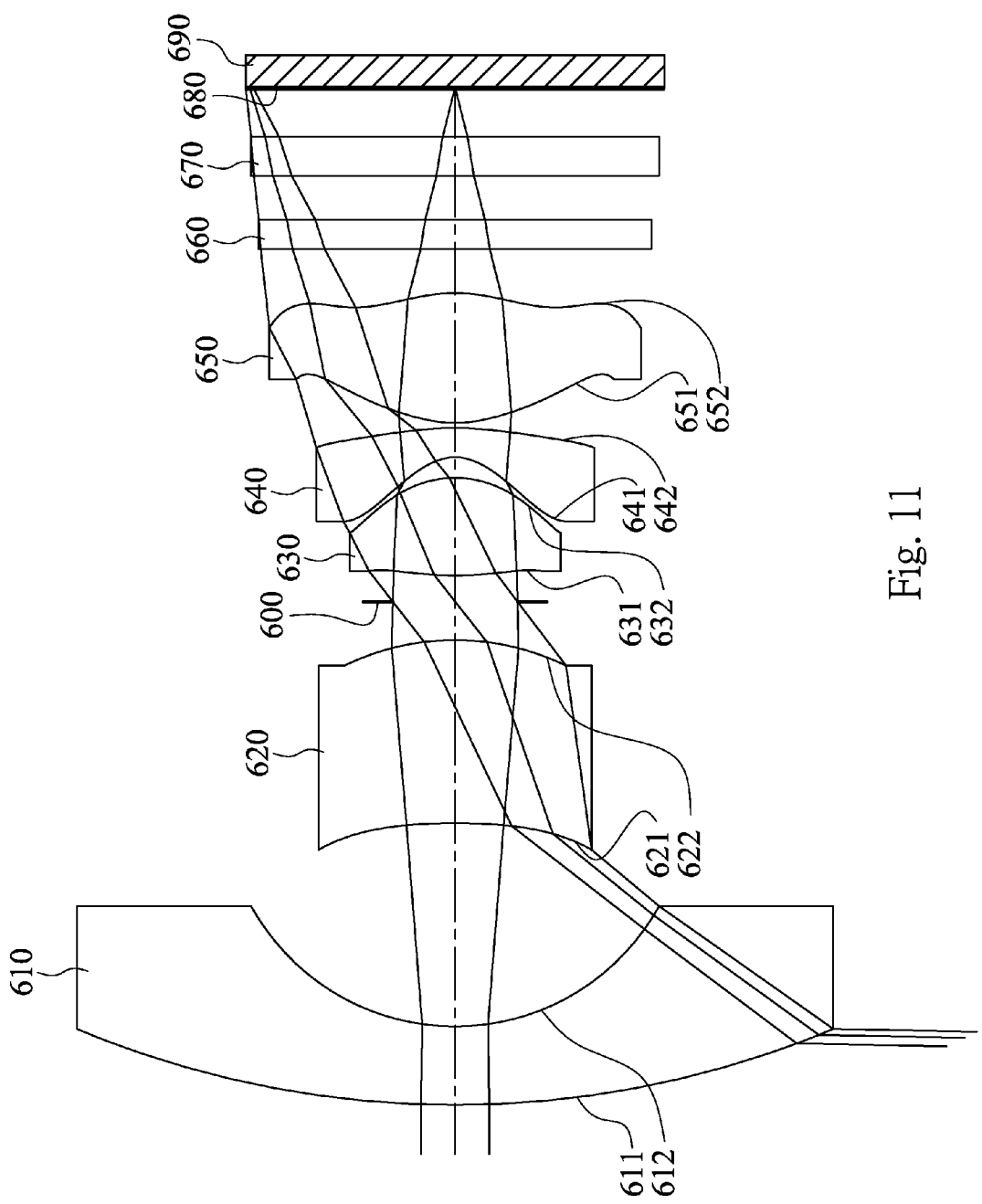
FIG. 11 is a schematic view of an image capturing device according to the 6th embodiment of the present disclosure.
Figure 12:
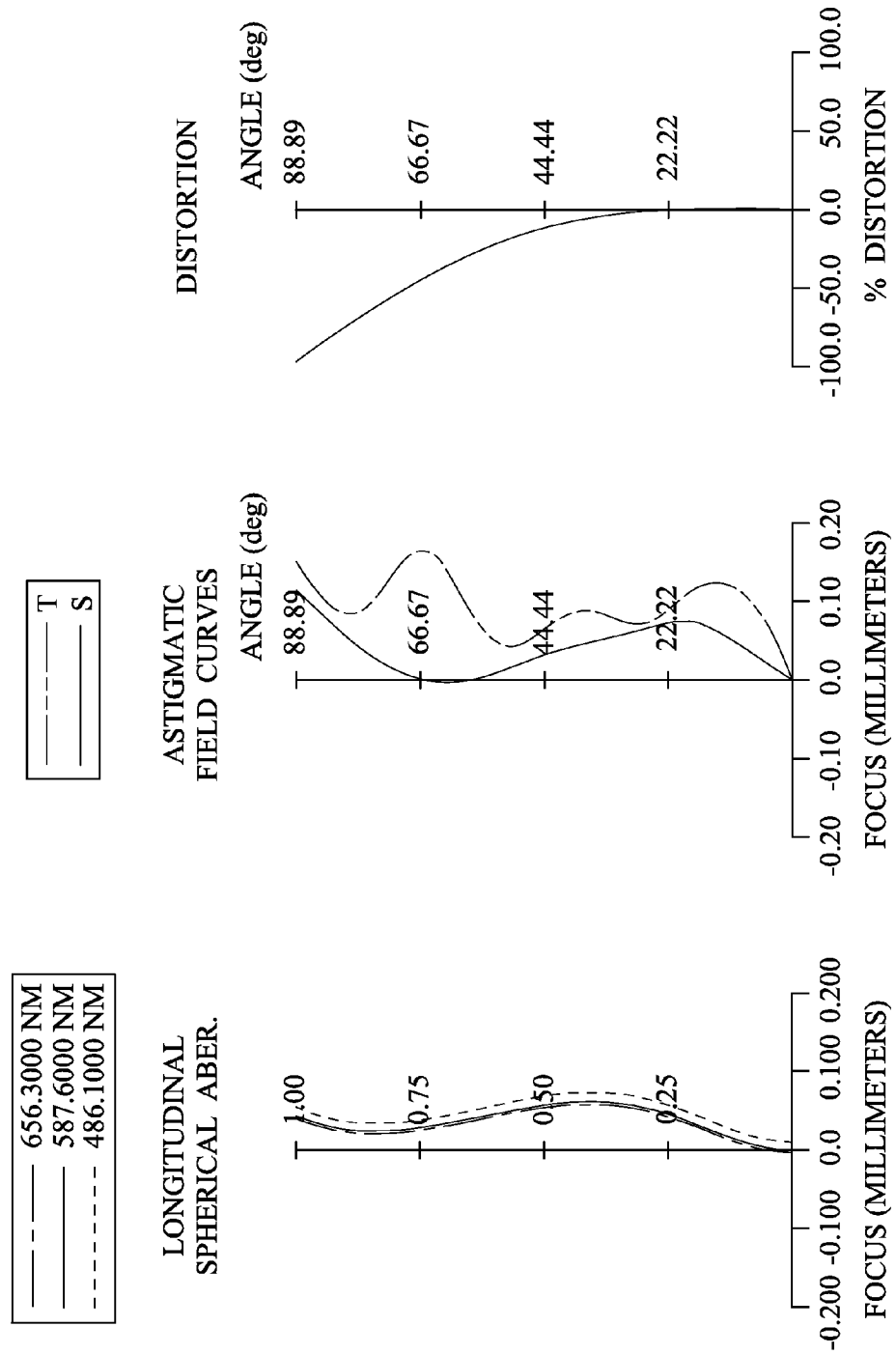
FIG. 12 shows spherical aberration curves, astigmatic field curves and a distortion curve of the image capturing device according to the 6th embodiment.

FIG. 11 is a schematic view of a photographing lens system according to the 6th embodiment of the present disclosure. FIG. 12 shows, in order from left to right, spherical aberration curves, astigmatic field curves and a distortion curve of the photographing lens system according to the 6th embodiment.

In FIG. 11, the image capturing device includes the photographing lens system (its reference numeral is omitted) of the present disclosure and an image sensor 690. The photographing lens system includes, in order from an object side to an image side, a first lens element 610, a second lens element 620, an aperture stop 600, a third lens element 630, a fourth lens element 640, a fifth lens element 650, an IR-cut filter 660, a cover glass 670 and an image surface 680. The image sensor 690 is disposed on the image surface 680 of the photographing lens system. The photographing lens system has a total of five lens elements (610-650) with refractive power. Moreover, there is an air gap between any two of the first lens element 610, the second lens element 620, the third lens element 630, the fourth lens element 640, and the fifth lens element 650 that are adjacent to each other.

The first lens element 610 with negative refractive power has a convex object-side surface 611 and a concave image-side surface 612. The first lens element 610 is made of glass material and has the object-side surface 611 and the image-side surface 612 being both spherical.

The second lens element 620 with positive refractive power has a concave object-side surface 621 and a convex image-side surface 622. The second lens element 620 is made of plastic material and has the object-side surface 621 and the image-side surface 622 being both aspheric.

The third lens element 630 with positive refractive power has a convex object-side surface 631 and a convex image-side surface 632. The third lens element 630 is made of plastic material and has the object-side surface 631 and the image-side surface 632 being both aspheric.

The fourth lens element 640 with negative refractive power has a concave object-side surface 641 and a convex image-side surface 642. The fourth lens element 640 is made of plastic material and has the object-side surface 641 and the image-side surface 642 being both aspheric. Furthermore, the object-side surface 641 of the fourth lens element 640 has at least one inflection point in an off-axial region thereon.

The fifth lens element 650 with positive refractive power has a convex object-side surface 651 and a convex image-side surface 652. The fifth lens element 650 is made of plastic material and has the object-side surface 651 and the image-side surface 652 being both aspheric. Furthermore, both of the object-side surface 651 and the image-side surface 652 of the fifth lens element 650 have at least one inflection point in an off-axial region thereon.

The IR-cut filter 660 and the cover glass 670 are made of glass material and located between the fifth lens element 650 and the image surface 680 in sequence, and will not affect the focal length of the photographing lens system.

The detailed optical data of the 6th embodiment are shown in TABLE 11 and the aspheric surface data are shown in TABLE 12 below.

TABLE 11

6th Embodiment
f = 1.41 mm, Fno = 2.02, HFOV = 88.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.000 | | 0.802 | Glass | 1.724 | 38.1 | −4.51 |
| 2 | | 2.380 | | 2.081 | | | | |
| 3 | Lens 2 | −5.724 | ASP | 1.870 | Plastic | 1.614 | 25.6 | 6.66 |
| 4 | | −2.683 | ASP | 0.394 | | | | |
| 5 | Ape. Stop | Plano | | 0.268 | | | | |
| 6 | Lens 3 | 3.621 | ASP | 0.997 | Plastic | 1.514 | 56.8 | 1.78 |
| 7 | | −1.105 | ASP | 0.211 | | | | |
| 8 | Lens 4 | −0.465 | ASP | 0.300 | Plastic | 1.614 | 25.6 | −1.02 |
| 9 | | −2.286 | ASP | 0.050 | | | | |
| 10 | Lens 5 | 1.240 | ASP | 1.327 | Plastic | 1.535 | 55.7 | 1.60 |
| 11 | | −1.717 | ASP | 0.450 | | | | |
| 12 | IR-cut filter | Plano | | 0.300 | Glass | 1.517 | 64.2 | — |
| 13 | | Plano | | 0.450 | | | | |
| 14 | Cover glass | Plano | | 0.400 | Glass | 1.517 | 64.2 | — |
| 15 | | Plano | | 0.497 | | | | |
| 16 | Image | Plano | | — | | | | |

Note:
Reference wave ength is 587.6 nm (d-line).

TABLE 12

Aspheric Coefficients

| Surface # | 3 | 4 | 6 | 7 |
|---|---|---|---|---|
| k = | 1.0567E+01 | −3.3295E+00 | −3.8494E+00 | −1.6701E+00 |
| A4 = | 2.2651E−03 | −4.2436E−02 | 6.2332E−03 | −2.4884E−01 |
| A6 = | −2.5048E−02 | 1.8644E−02 | −1.8864E−01 | 7.6513E−02 |
| A8 = | 1.3541E−02 | −5.8451E−03 | 3.6405E−01 | 4.6560E−01 |
| A10 = | −3.9657E−03 | 1.2813E−03 | −7.6310E−01 | −7.0168E−01 |
| A12 = | 6.7219E−04 | −2.3265E−04 | 4.9351E−01 | 3.0604E−01 |

| Surface # | 8 | 9 | 10 | 11 |
|---|---|---|---|---|
| k = | −2.4872E+00 | −9.8926E+01 | −6.9888E+00 | −7.7728E−01 |
| A4 = | −7.7184E−01 | −1.0121E−01 | 2.1940E−02 | 1.2315E−01 |
| A6 = | 1.7599E+00 | 1.5697E−01 | 4.5041E−02 | 8.0274E−02 |
| A8 = | −1.9340E+00 | −1.3331E−01 | −4.8926E−02 | −6.5354E−02 |
| A10 = | 1.1800E+00 | 5.9745E−02 | 2.0185E−02 | 1.5408E−02 |
| A12 = | −2.9130E−01 | −1.1085E−02 | −3.6557E−03 | −1.3339E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 1.41 | (R7 + R8)/(R7 − R8) | −1.51 |
| Fno | 2.02 | f/f12 | 0.07 |
| HFOV (deg.) | 88.9 | \|f/f2\| | 0.21 |
| FOV (deg.) | 177.8 | \|f/R3\| + \|f/R4\| | 0.77 |
| ΣCT/CT2 | 2.83 | N2 + N4 | 3.23 |
| T23/CT2 | 0.35 | | |

Furthermore, in the photographing lens system of the image capturing device according to the 6th embodiment, when the axial distance between the second lens element 620 and the third lens element 630 is T23, and a central thickness of the third lens element 630 is CT3, the following condition is satisfied: T23<CT3.

7th Embodiment

Figure 13:
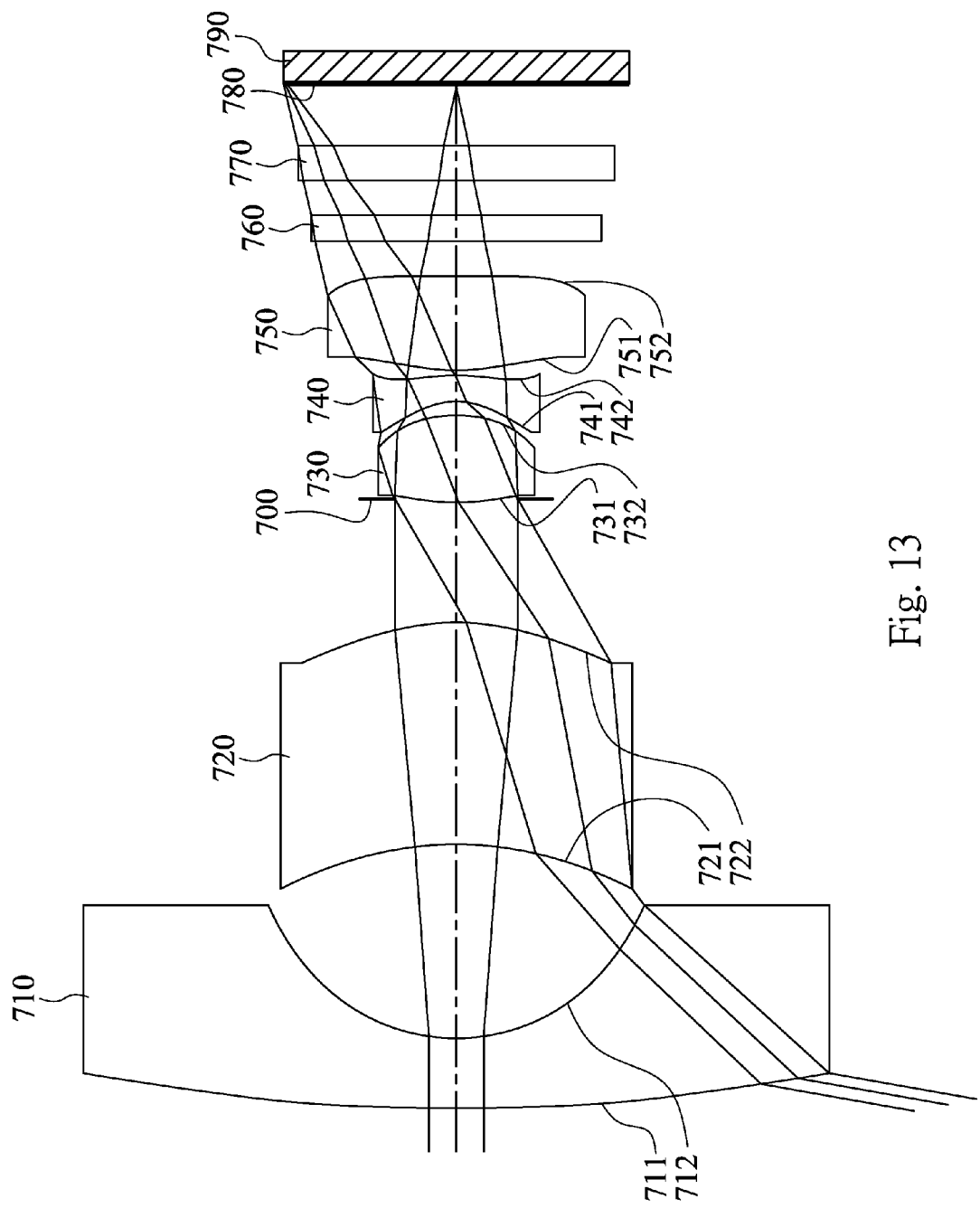
FIG. 13 is a schematic view of an image capturing device according to the 7th embodiment of the present disclosure.
Figure 14:
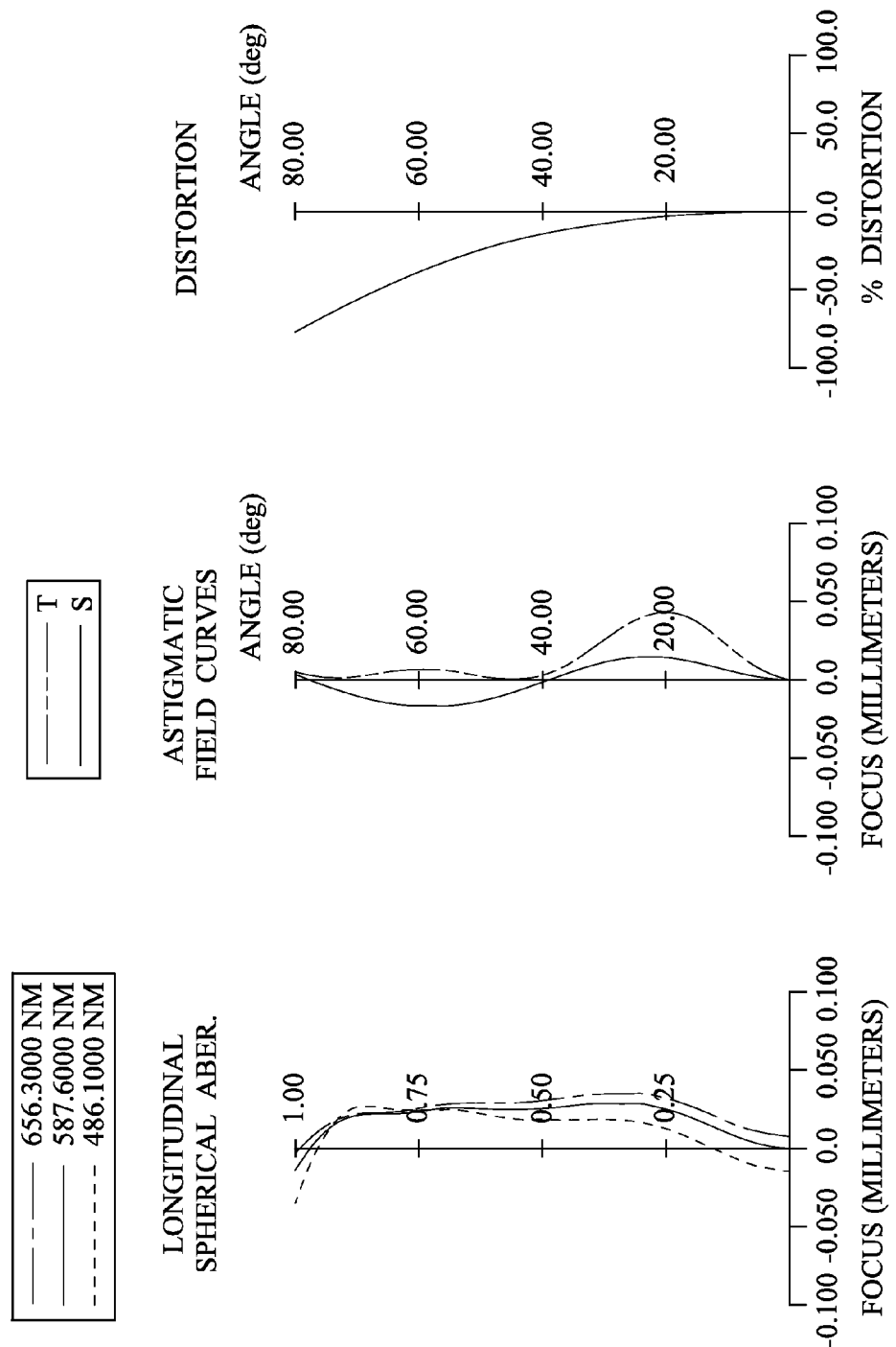
FIG. 14 shows spherical aberration curves, astigmatic field curves and a distortion curve of the image capturing device according to the 7th embodiment.

FIG. 13 is a schematic view of a photographing lens system according to the 7th embodiment of the present disclosure. FIG. 14 shows, in order from left to right, spherical aberration curves, astigmatic field curves and a distortion curve of the photographing lens system according to the 7th embodiment.

In FIG. 13, the image capturing device includes the photographing lens system (its reference numeral is omitted) of the present disclosure and an image sensor 790. The photographing lens system includes, in order from an object side to an image side, a first lens element 710, a second lens element 720, an aperture stop 700, a third lens element 730, a fourth lens element 740, a fifth lens element 750, an IR-cut filter 760, a cover glass 770 and an image surface 780. The image sensor 790 is disposed on the image surface 780 of the photographing lens system. The photographing lens system has a total of five lens elements (710-750) with refractive power. Moreover, there is an air gap between any two of the first lens element 710, the second lens element 720, the third lens element 730, the fourth lens element 740, and the fifth lens element 750 that are adjacent to each other.

The first lens element 710 with negative refractive power has a convex object-side surface 711 and a concave image-side surface 712. The first lens element 710 is made of plastic material and has the object-side surface 711 and the image-side surface 712 being both aspheric.

The second lens element 720 with positive refractive power has a concave object-side surface 721 and a convex image-side surface 722. The second lens element 720 is made of plastic material and has the object-side surface 721 and the image-side surface 722 being both aspheric.

The third lens element 730 with positive refractive power has a convex object-side surface 731 and a convex image-side surface 732. The third lens element 730 is made of plastic material and has the object-side surface 731 and the image-side surface 732 being both aspheric.

The fourth lens element 740 with negative refractive power has a concave object-side surface 741 and a convex image-side surface 742. The fourth lens element 740 is made of plastic material and has the object-side surface 741 and the image-side surface 742 being both aspheric. Furthermore, both of the object-side surface 741 and the image-side surface 742 of the fourth lens element 740 have at least one inflection point in an off-axial region thereon.

The fifth lens element 750 with positive refractive power has a convex object-side surface 751 and a convex image-side surface 752. The fifth lens element 750 is made of plastic material and has the object-side surface 751 and the image-side surface 752 being both aspheric. Furthermore, the object-side surface 751 of the fifth lens element 750 has at least one inflection point in an off-axial region thereon.

The IR-cut filter 760 and the cover glass 770 are made of glass material and located between the fifth lens element 750 and the image surface 780 in sequence, and will not affect the focal length of the photographing lens system.

The detailed optical data of the 7th embodiment are shown in TABLE 13 and the aspheric surface data are shown in TABLE 14 below.

TABLE 13

7th Embodiment
f = 1.52 mm, Fno = 2.40, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 46.681 | ASP | 0.800 | Plastic | 1.544 | 55.9 | −4.38 |
| 2 | | 2.253 | ASP | 2.229 | | | | |
| 3 | Lens 2 | −3.940 | ASP | 2.548 | Plastic | 1.639 | 23.5 | 7.70 |
| 4 | | −2.739 | ASP | 1.419 | | | | |
| 5 | Ape. Stop | Plano | | −0.040 | | | | |
| 6 | Lens 3 | 2.821 | ASP | 1.001 | Plastic | 1.544 | 55.9 | 2.11 |
| 7 | | −1.698 | ASP | 0.160 | | | | |
| 8 | Lens 4 | −0.792 | ASP | 0.300 | Plastic | 1.639 | 23.5 | −2.10 |
| 9 | | −2.215 | ASP | 0.055 | | | | |
| 10 | Lens 5 | 2.123 | ASP | 1.085 | Plastic | 1.544 | 55.9 | 3.82 |
| 11 | | −77.793 | ASP | 0.400 | | | | |
| 12 | IR-cut filter | Plano | | 0.300 | Glass | 1.517 | 64.2 | — |
| 13 | | Plano | | 0.400 | | | | |
| 14 | Cover glass | Plano | | 0.400 | Glass | 1.517 | 64.2 | — |
| 15 | | Plano | | 0.711 | | | | |
| 16 | Image | Plano | | — | | | | |

Note:
Reference wave ength is 587.6 nm (d-line).

TABLE 14

Aspheric Coefficients

| Surface # | 1 | 2 | 3 | 4 | 6 |
|---|---|---|---|---|---|
| k = | 9.1926E+01 | −1.1077E−01 | −1.0503E−01 | −5.3489E+00 | −6.7400E+01 |
| A4 = | 3.1941E−03 | 4.4778E−03 | 1.7355E−03 | −7.3757E−03 | 3.4395E−01 |
| A6 = | −3.3060E−04 | −2.4932E−04 | 7.9458E−04 | 2.3728E−03 | −8.4455E−01 |
| A8 = | 1.3651E−05 | 2.4230E−04 | −1.9626E−04 | −5.2718E−04 | 1.3080E+00 |
| A10 = | −2.1569E−07 | −4.8345E−05 | 7.9780E−06 | 4.8371E−05 | −1.1486E+00 |

| Surface # | 7 | 8 | 9 | 10 | 11 |
|---|---|---|---|---|---|
| k = | −2.2204E+00 | −4.7407E+00 | −4.2238E+01 | −5.0168E+00 | 9.9000E+01 |
| A4 = | −2.3780E−01 | −4.5491E−01 | −5.9655E−02 | −1.4726E−01 | 6.3499E−03 |
| A6 = | −9.9843E−02 | 8.0954E−01 | 4.1883E−01 | 1.5434E−01 | −3.0683E−02 |
| A8 = | 3.2010E−01 | −6.9326E−01 | −3.1505E−01 | −9.9062E−02 | 8.0049E−03 |
| A10 = | −2.5870E−01 | 2.5490E−01 | 1.0565E−01 | 2.5273E−02 | −2.0742E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 1.52 | (R7 + R8)/(R7 − R8) | −2.11 |
| Fno | 2.40 | f/f12 | 0.08 |
| HFOV (deg.) | 80.0 | \|f/f2\| | 0.20 |
| FOV (deg.) | 160.0 | \|f/R3\| + \|f/R4\| | 0.94 |
| ΣCT/CT2 | 2.25 | N2 + N4 | 3.28 |
| T23/CT2 | 0.54 | | |

8th Embodiment

Figure 15:
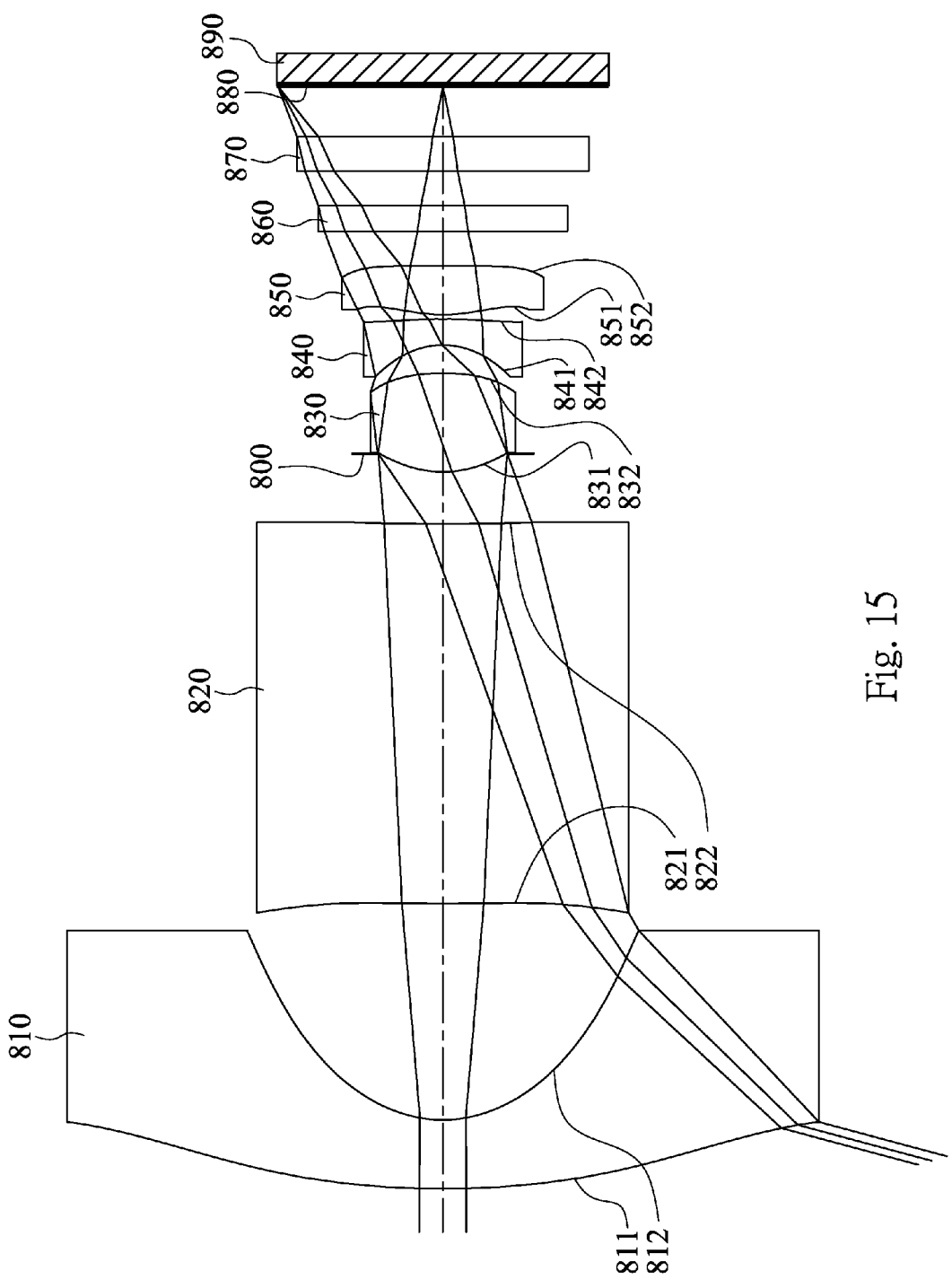
FIG. 15 is a schematic view of an image capturing device according to the 8th embodiment of the present disclosure.
Figure 16:
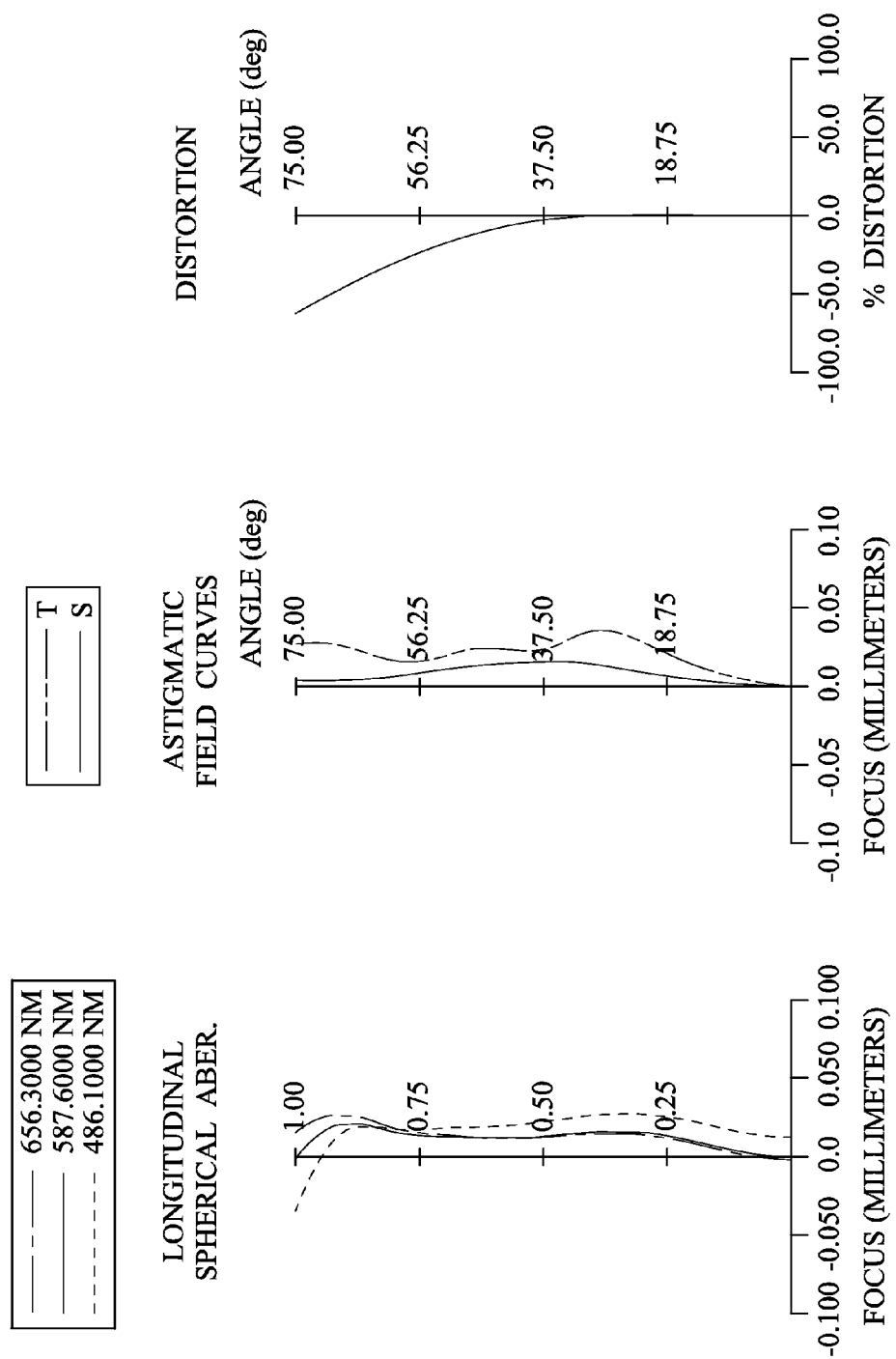
FIG. 16 shows spherical aberration curves, astigmatic field curves and a distortion curve of the image capturing device according to the 8th embodiment.

FIG. 15 is a schematic view of a photographing lens system according to the 8th embodiment of the present disclosure. FIG. 16 shows, in order from left to right, spherical aberration curves, astigmatic field curves and a distortion curve of the photographing lens system according to the 8th embodiment.

In FIG. 15, the image capturing device includes the photographing lens system (its reference numeral is omitted) of the present disclosure and an image sensor 890. The photographing lens system includes, in order from an object side to an image side, a first lens element 810, a second lens element 820, an aperture stop 800, a third lens element 830, a fourth lens element 840, a fifth lens element 850, an IR-cut filter 860, a cover glass 870 and an image surface 880. The image sensor 890 is disposed on the image surface 880 of the photographing lens system. The photographing lens system has a total of five lens elements (810-850) with refractive power. Moreover, there is an air gap between any two of the first lens element 810, the second lens element 820, the third lens element 830, the fourth lens element 840, and the fifth lens element 850 that are adjacent to each other.

The first lens element 810 with negative refractive power has a convex object-side surface 811 and a concave image-side surface 812. The first lens element 810 is made of plastic material and has the object-side surface 811 and the image-side surface 812 being both aspheric.

The second lens element 820 with negative refractive power has a convex object-side surface 821 and a concave image-side surface 822. The second lens element 820 is made of plastic material and has the object-side surface 821 and the image-side surface 822 being both aspheric.

The third lens element 830 with positive refractive power has a convex object-side surface 831 and a convex image-side surface 832. The third lens element 830 is made of plastic material and has the object-side surface 831 and the image-side surface 832 being both aspheric.

The fourth lens element 840 with negative refractive power has a concave object-side surface 841 and a convex image-side surface 842. The fourth lens element 840 is made of plastic material and has the object-side surface 841 and the image-side surface 842 being both aspheric. Furthermore, the image-side surface 842 of the fourth lens element 840 has at least one inflection point in an off-axial region thereof.

The fifth lens element 850 with positive refractive power has a convex object-side surface 851 and a convex image-side surface 852. The fifth lens element 850 is made of plastic material and has the object-side surface 851 and the image-side surface 852 being both aspheric. Furthermore, the object-side surface 851 of the fifth lens element 850 has at least one inflection point in an off-axial region thereof.

The IR-cut filter 860 and the cover glass 870 are made of glass material and located between the fifth lens element 850 and the image surface 880 in sequence, and will not affect the focal length of the photographing lens system.

The detailed optical data of the 8th embodiment are shown in TABLE 15 and the aspheric surface data are shown in TABLE 16 below.

TABLE 15

8th Embodiment
f = 1.37 mm, Fno = 2.50, HFOV = 75.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 11.183 ASP | 0.800 | Plastic | 1.544 | 55.9 | −3.29 |
| 2 | | 1.506 ASP | 2.516 | | | | |
| 3 | Lens 2 | 23.604 ASP | 4.414 | Plastic | 1.639 | 23.5 | −136.92 |

TABLE 15-continued

8th Embodiment
f = 1.37 mm, Fno = 2.50, HFOV = 75.0 deg.

| Surface # | | Curvature Radius | | Thickness | Material | Index | Abbe # | Focal Length |
|---|---|---|---|---|---|---|---|---|
| 4 | | 17.234 | ASP | 0.816 | | | | |
| 5 | Ape. Stop | Plano | | −0.211 | | | | |
| 6 | Lens 3 | 1.250 | ASP | 1.150 | Plastic | 1.544 | 55.9 | 1.70 |
| 7 | | −2.403 | ASP | 0.327 | | | | |
| 8 | Lens 4 | −0.859 | ASP | 0.300 | Plastic | 1.639 | 23.5 | −1.53 |
| 9 | | −7.980 | ASP | 0.050 | | | | |
| 10 | Lens 5 | 1.665 | ASP | 0.571 | Plastic | 1.544 | 55.9 | 2.93 |
| 11 | | −33.726 | ASP | 0.400 | | | | |
| 12 | IR-cut filter | Plano | | 0.300 | Glass | 1.517 | 64.2 | — |
| 13 | | Plano | | 0.400 | | | | |
| 14 | Cover glass | Plano | | 0.400 | Glass | 1.517 | 64.2 | — |
| 15 | | Plano | | 0.601 | | | | |
| 16 | Image | Plano | | — | | | | |

Note:
Reference wavelength is 587.6 nm (d-line).

TABLE 16

Aspheric Coefficients

| Surface # | 1 | 2 | 3 | 4 | 6 |
|---|---|---|---|---|---|
| k = | −8.7721E+00 | −9.3006E−01 | 9.5437E+01 | −3.5026E+01 | −7.2121E+00 |
| A4 = | 3.0376E−03 | 3.7209E−03 | −2.0457E−02 | −4.3079E−02 | 3.7445E−01 |
| A6 = | −1.7662E−04 | −5.4847E−05 | 4.9152E−03 | 4.0632E−02 | −5.8594E−01 |
| A8 = | −1.4320E−05 | 4.3292E−03 | −1.4071E−03 | −1.6583E−02 | 7.6072E−01 |
| A10 = | 2.3192E−06 | −2.4181E−03 | 2.3149E−04 | 8.5001E−03 | −5.3227E−01 |
| A12 = | −1.3367E−07 | 6.5442E−04 | −1.4721E−05 | −6.0902E−04 | |
| A14 = | 3.7265E−09 | −8.6434E−05 | 8.5132E−07 | 8.0315E−05 | |
| A16 = | −4.2156E−11 | 4.2923E−06 | −1.3610E−07 | −4.2517E−06 | |

| Surface # | 7 | 8 | 9 | 10 | 11 |
|---|---|---|---|---|---|
| k = | −3.5270E+00 | −3.8960E+00 | 2.8710E+01 | −8.0788E+00 | −1.0000E+00 |
| A4 = | −1.1400E−01 | −3.8147E−01 | 5.4494E−02 | −1.4628E−01 | 4.2309E−02 |
| A6 = | −3.8494E−01 | −1.1490E−01 | −5.5266E−01 | 5.8053E−02 | −1.5080E−01 |
| A8 = | 2.1063E+00 | 1.7575E+00 | 2.3110E+00 | 2.9482E−04 | 1.0761E−01 |
| A10 = | −6.4607E+00 | −5.3010E+00 | −4.5550E+00 | −7.9882E−02 | −4.1312E−02 |
| A12 = | 1.0586E+01 | 7.0660E+00 | 4.8377E+00 | 1.5458E−02 | −3.7715E−03 |
| A14 = | −9.1851E+00 | −3.9690E+00 | −2.6395E+00 | 6.6471E−03 | 5.3354E−03 |
| A16 = | 3.3022E+00 | 7.7188E−01 | 6.1021E−01 | −2.8916E−03 | −9.4193E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 1.37 | (R7 + R8)/(R7 − R8) | −1.24 |
| Fno | 2.50 | f/f12 | −0.47 |
| HFOV (deg.) | 75.0 | \|f/f2\| | 0.01 |
| FOV (deg.) | 150.0 | \|f/R3\| + \|f/R4\| | 0.14 |
| ΣCT/CT2 | 1.64 | N2 + N4 | 3.28 |
| T23/CT2 | 0.14 | | |

Furthermore, in the photographing lens system of the image capturing device according to the 8th embodiment, when the axial distance between the second lens element 820 and the third lens element 830 is T23, and a central thickness of the third lens element 830 is CT3, the following condition is satisfied: T23<CT3.

9th Embodiment

Figure 17:
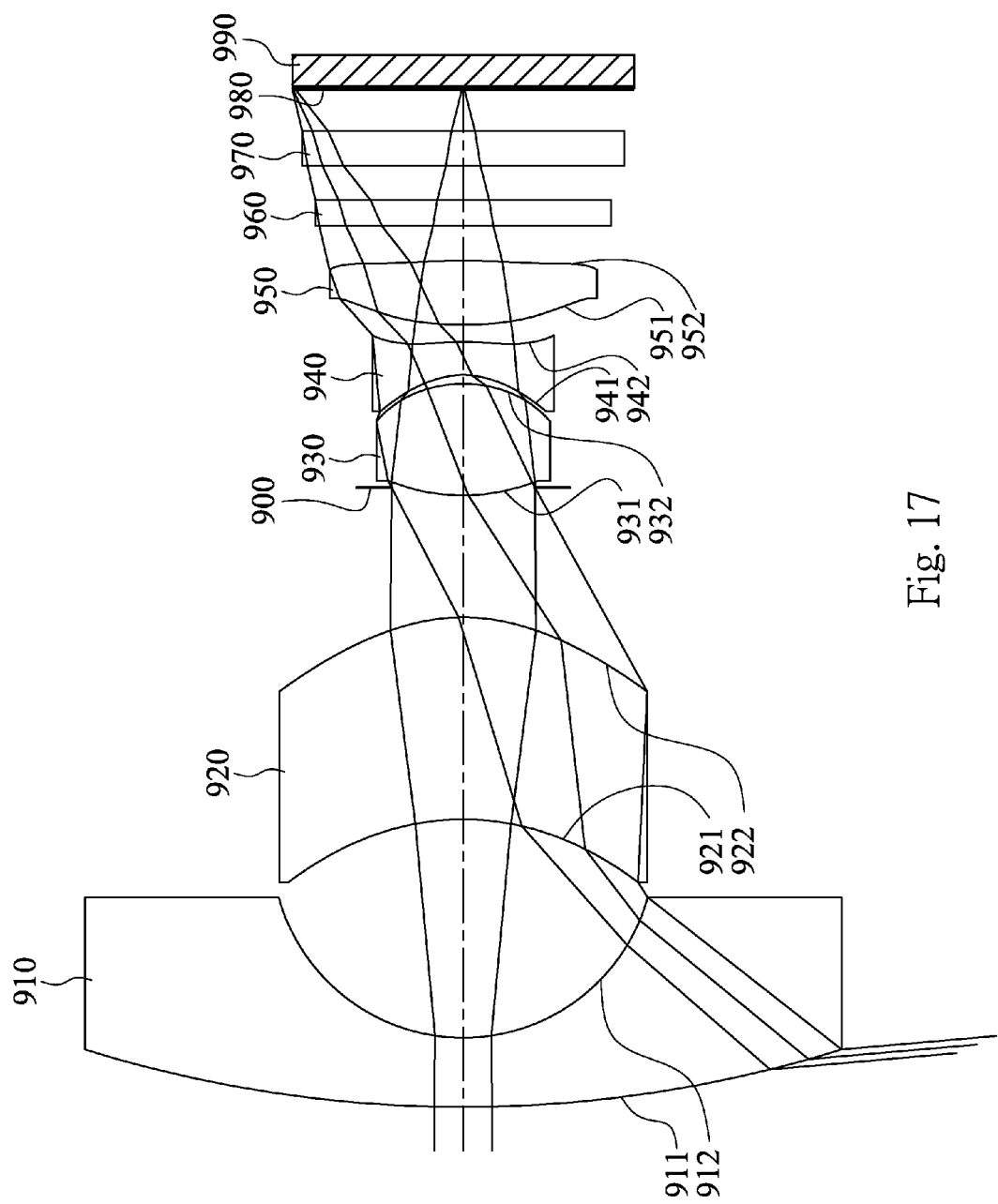
FIG. 17 is a schematic view of an image capturing device according to the 9th embodiment of the present disclosure.
Figure 18:
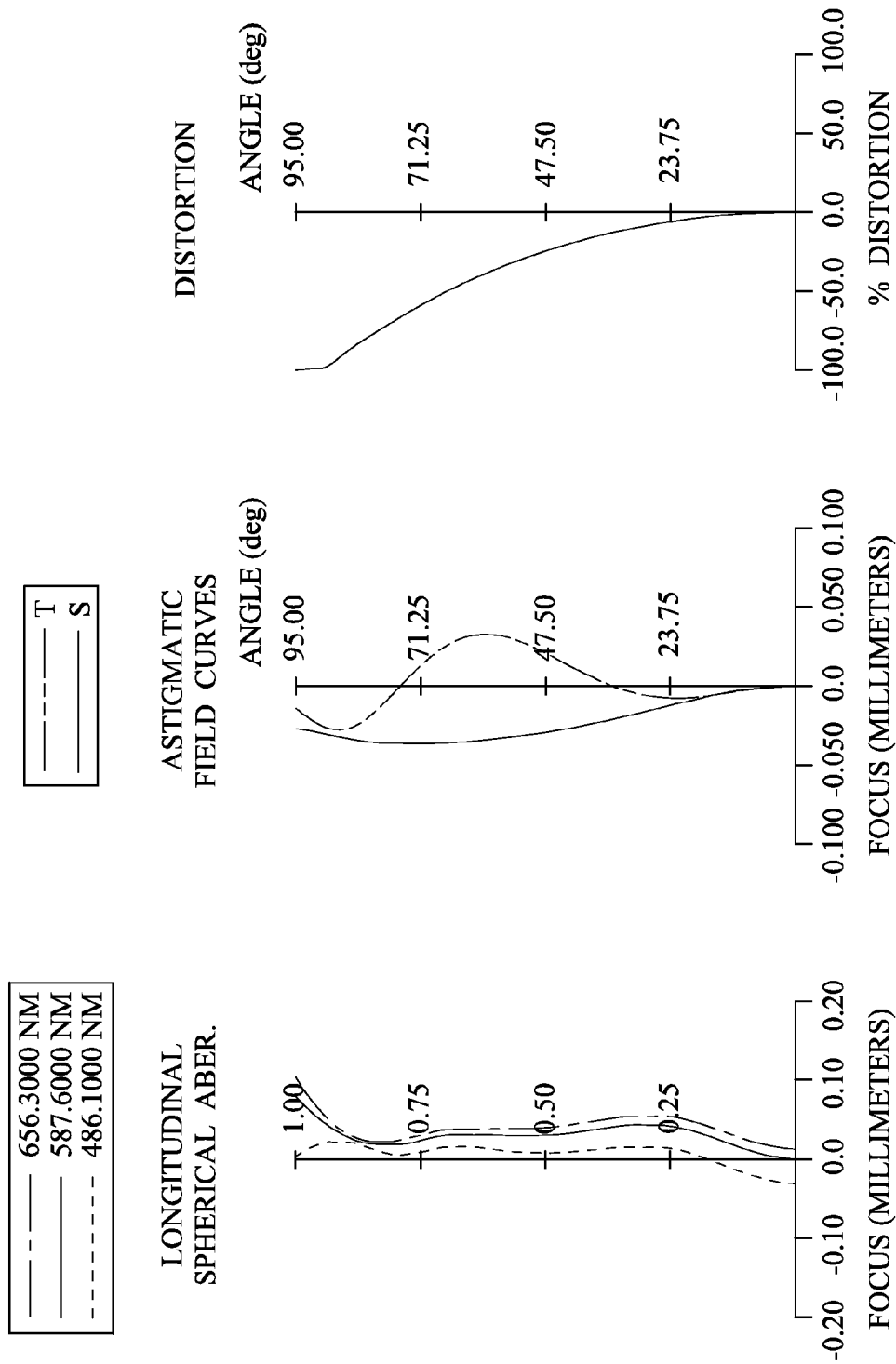
FIG. 18 shows spherical aberration curves, astigmatic field curves and a distortion curve of the image capturing device according to the 9th embodiment.

FIG. 17 is a schematic view of a photographing lens system according to the 9th embodiment of the present disclosure. FIG. 18 shows, in order from left to right, spherical aberration curves, astigmatic field curves and a distortion curve of the photographing lens system according to the 9th embodiment.

In FIG. 17, the image capturing device includes the photographing lens system (its reference numeral is omitted) of the present disclosure and an image sensor 990. The photographing lens system includes, in order from an object side to an image side, a first lens element 910, a second lens element 920, an aperture stop 900, a third lens element 930, a fourth lens element 940, a fifth lens element 950, an IR-cut filter 960, a cover glass 970 and an image surface 980. The image sensor 990 is disposed on the image surface 980 of the photographing lens system. The photographing lens system has a total of five lens elements (910-950) with refractive power. Moreover, there is an air gap between any two of the first lens element 910, the second lens element 920, the third lens element 930, the fourth lens element 940, and the fifth lens element 950 that are adjacent to each other.

The first lens element 910 with negative refractive power has a convex object-side surface 911 and a concave image-side surface 912. The first lens element 910 is made of glass material and has the object-side surface 911 and the image-side surface 912 being both spherical.

The second lens element 920 with positive refractive power has a concave object-side surface 921 and a convex image-side surface 922. The second lens element 920 is made of plastic material and has the object-side surface 921 and the image-side surface 922 being both aspheric.

The third lens element 930 with positive refractive power has a convex object-side surface 931 and a convex image-side surface 932. The third lens element 930 is made of plastic material and has the object-side surface 931 and the image-side surface 932 being both aspheric.

The fourth lens element 940 with negative refractive power has a concave object-side surface 941 and a convex image-side surface 942. The fourth lens element 940 is made of plastic material and has the object-side surface 941 and the image-side surface 942 being both aspheric. Furthermore, both of the object-side surface 941 and the image-side surface 942 of the fourth lens element 940 have at least one inflection point in an off-axial region thereon.

The fifth lens element 950 with positive refractive power has a convex object-side surface 951 and a convex image-side surface 952. The fifth lens element 950 is made of plastic material and has the object-side surface 951 and the image-side surface 952 being both aspheric. Furthermore, both of the object-side surface 951 and the image-side surface 952 of the fifth lens element 950 have at least one inflection point in an off-axial region thereon.

The IR-cut filter 960 and the cover glass 970 are made of glass material and located between the fifth lens element 950 and the image surface 980 in sequence, and will not affect the focal length of the photographing lens system.

The detailed optical data of the 9th embodiment are shown in TABLE 17 and the aspheric surface data are shown in TABLE 18 below.

TABLE 17

9th Embodiment
f = 1.35 mm, Fno = 2.02, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.667 | | 0.800 | Glass | 1.724 | 38.1 | −3.69 |
| 2 | | 2.209 | | 2.526 | | | | |
| 3 | Lens 2 | −2.999 | ASP | 2.335 | Plastic | 1.639 | 23.5 | 6.31 |
| 4 | | −2.242 | ASP | 1.503 | | | | |
| 5 | Ape. Stop | Plano | | −0.094 | | | | |
| 6 | Lens 3 | 2.342 | ASP | 1.290 | Plastic | 1.535 | 55.7 | 1.96 |
| 7 | | −1.529 | ASP | 0.103 | | | | |
| 8 | Lens 4 | −0.963 | ASP | 0.380 | Plastic | 1.639 | 23.5 | −2.21 |
| 9 | | −3.492 | ASP | 0.200 | | | | |
| 10 | Lens 5 | 4.437 | ASP | 0.740 | Plastic | 1.535 | 55.7 | 5.50 |
| 11 | | −8.211 | ASP | 0.400 | | | | |
| 12 | IR-cut filter | Plano | | 0.300 | Glass | 1.517 | 64.2 | — |
| 13 | | Plano | | 0.400 | | | | |
| 14 | Cover glass | Plano | | 0.400 | Glass | 1.517 | 64.2 | — |
| 15 | | Plano | | 0.484 | | | | |
| 16 | Image | Plano | | — | | | | |

Note:
Reference wave ength is 587.6 nm (d-line).

TABLE 18

| Aspheric Coefficients | | | | |
|---|---|---|---|---|
| Surface # | 3 | 4 | 6 | 7 |
| k = | −7.3585E−01 | −4.3756E+00 | −4.9485E+01 | −6.4662E+00 |
| A4 = | −2.1187E−03 | −2.0126E−02 | 4.1532E−01 | −2.9423E−01 |
| A6 = | −4.2061E−04 | 4.6301E−03 | −7.9325E−01 | 3.1776E−01 |
| A8 = | 3.0866E−04 | −6.8852E−04 | 1.0480E+00 | −3.6467E−01 |
| A10 = | −4.3833E−05 | 4.3266E−05 | −6.2135E−01 | 1.4106E−01 |
| Surface # | 8 | 9 | 10 | 11 |
| k = | −4.3386E+00 | 6.3332E+00 | 1.9242E+00 | 1.4327E+01 |
| A4 = | −3.2167E−01 | 2.7103E−01 | 6.1760E−02 | 3.3610E−02 |
| A6 = | 6.8627E−01 | 1.5972E−02 | −3.0308E−02 | −1.0342E−03 |
| A8 = | −9.6378E−01 | −1.4124E−01 | 6.9831E−03 | 1.6294E−03 |
| A10 = | 4.8019E−01 | 8.5026E−02 | −1.9693E−03 | −2.0932E−03 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 1.35 | (R7 + R8)/(R7 − R8) | −1.76 |
| Fno | 2.02 | f/f12 | 0.14 |
| HFOV (deg.) | 95.0 | \|f/f2\| | 0.21 |
| FOV (deg.) | 190.0 | \|f/R3\| + \|f/R4\| | 1.05 |
| ΣCT/CT2 | 2.36 | N2 + N4 | 3.28 |
| T23/CT2 | 0.60 | | |

10th Embodiment

Figure 19:
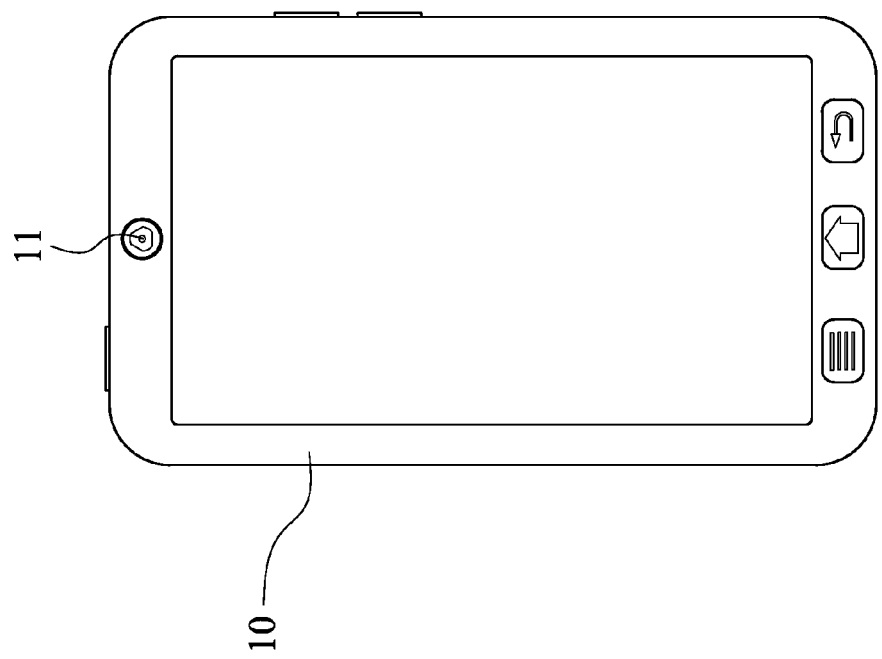
FIG. 19 shows an electronic terminal according to the 10th embodiment of the present disclosure.

FIG. 19 is a schematic view of an electronic terminal 10 according to the 10th embodiment of the present disclosure. The electronic terminal 10 of the 10th embodiment is a smart phone, wherein the electronic terminal 10 includes an image capturing device 11. The image capturing device 11 includes a photographing lens system (its reference numeral is omitted) according to the present disclosure and an image sensor (its reference numeral is omitted), wherein the image sensor is disposed on an image surface of the photographing lens system.

11th Embodiment

Figure 20:
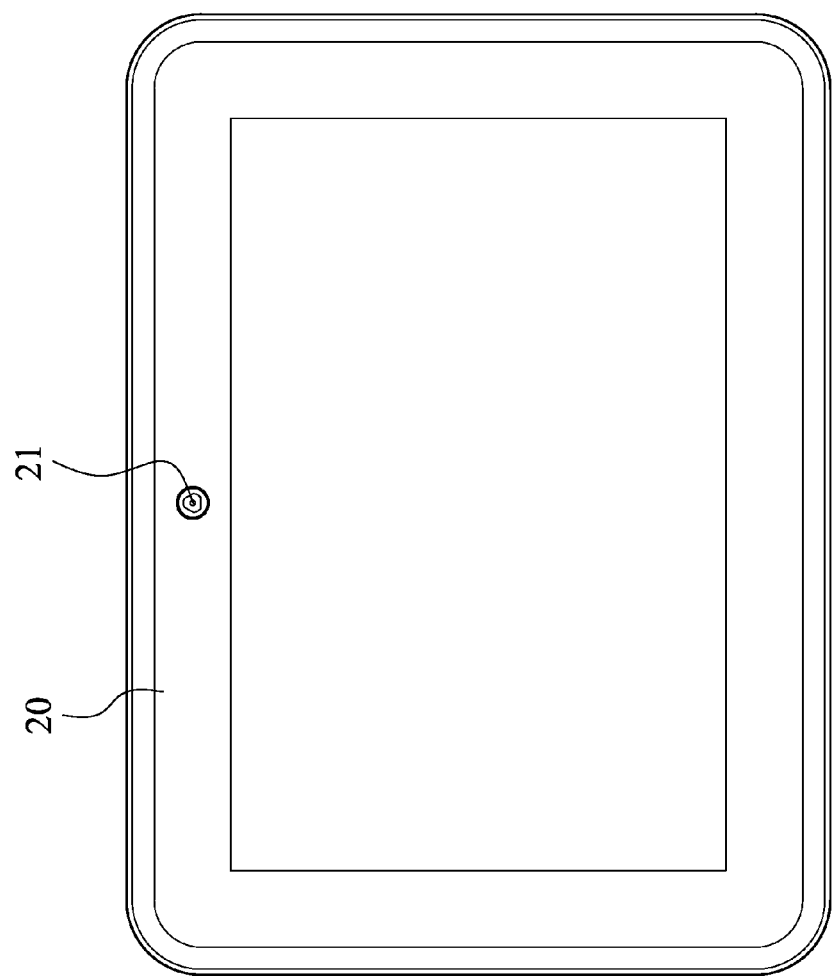
FIG. 20 shows an electronic terminal according to the 11th embodiment of the present disclosure.

FIG. 20 is a schematic view of an electronic terminal 20 according to the 11th embodiment of the present disclosure. The electronic terminal 20 of the 11th embodiment is a tablet personal computer, wherein the electronic terminal 20 includes an image capturing device 21. The image capturing device 21 includes a photographing lens system (its reference numeral is omitted) according to the present disclosure and an image sensor (its reference numeral is omitted), wherein the image sensor is disposed on an image surface of the photographing lens system.

12th Embodiment

Figure 21:
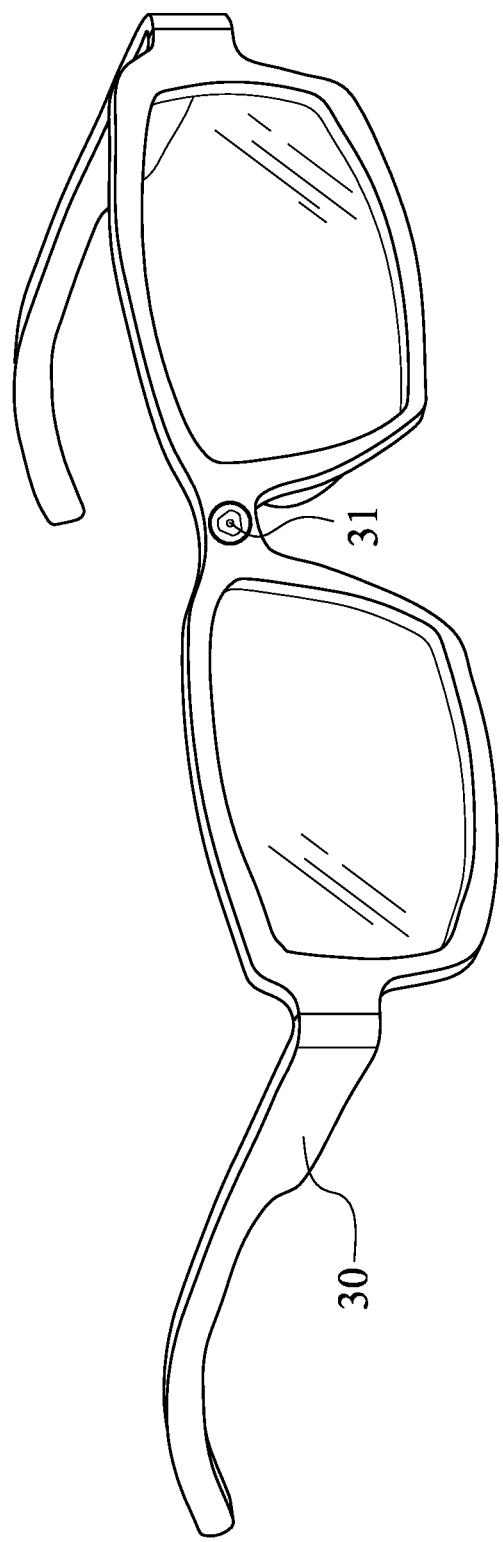
FIG. 21 shows an electronic terminal according to the 12th embodiment of the present disclosure.

FIG. 21 is a schematic view of an electronic terminal 30 according to the 12th embodiment of the present disclosure. The electronic terminal 30 of the 12th embodiment is a head-mounted display, wherein the electronic terminal 30 includes an image capturing device 31. The image capturing device 31 includes a photographing lens system (its reference numeral is omitted) according to the present disclosure and an image sensor (its reference numeral is omitted), wherein the image sensor is disposed on an image surface of the photographing lens system.

13th Embodiment

Figure 22:
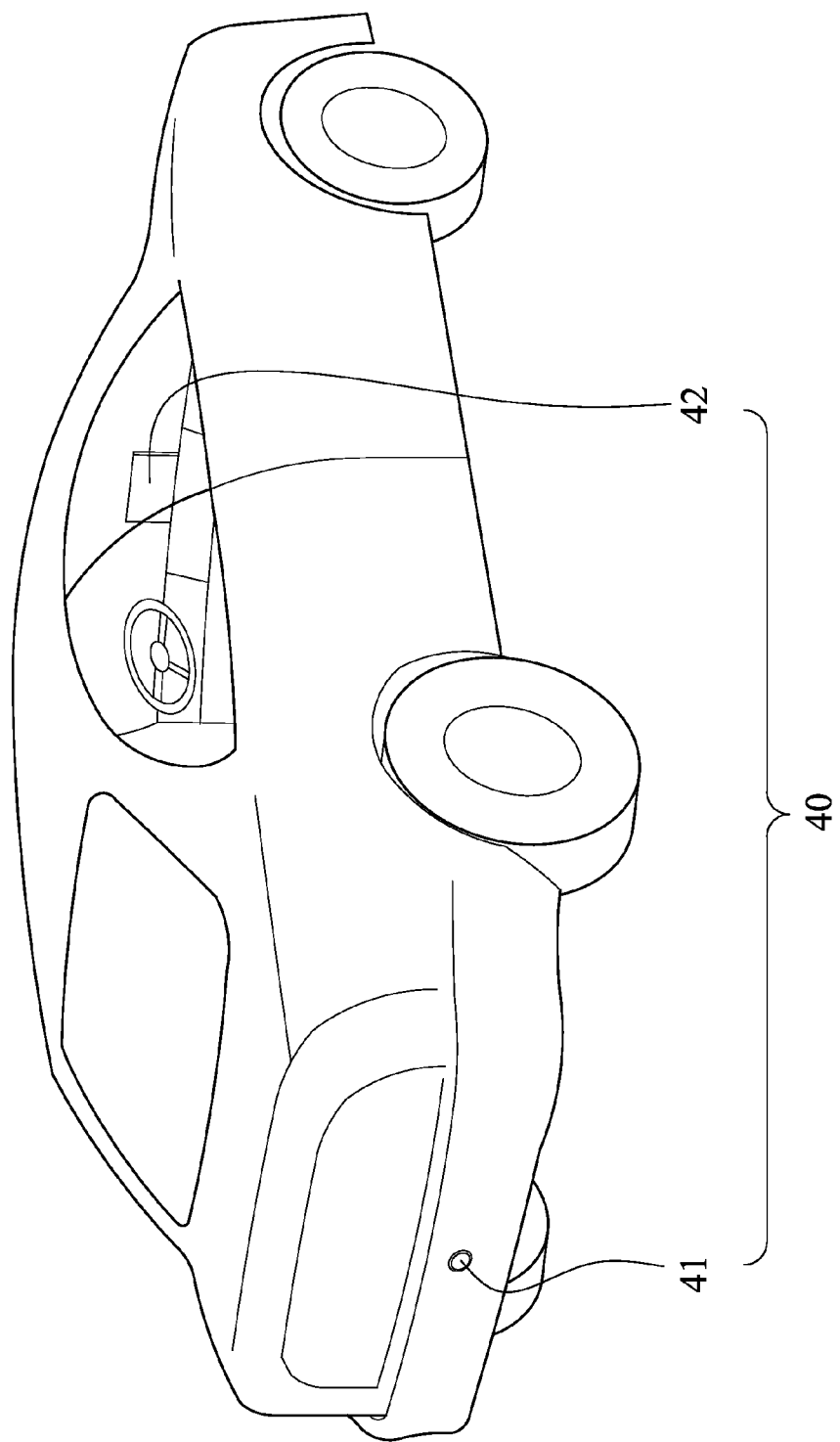
FIG. 22 shows an electronic terminal according to the 13th embodiment of the present disclosure.

FIG. 22 is a schematic view of an electronic terminal 40 according to the 13th embodiment of the present disclosure. The electronic terminal 40 of the 13th embodiment is a rear view camera system, wherein the electronic terminal 40 includes an image capturing device 41 and a monitor 42, and the image capturing device 41 is connected with the monitor 42. The image capturing device 41 includes a photographing lens system (its reference numeral is omitted) according to the present disclosure and an image sensor (its reference numeral is omitted), wherein the image sensor is disposed on an image surface of the photographing lens system.

14th Embodiment

Figure 23:
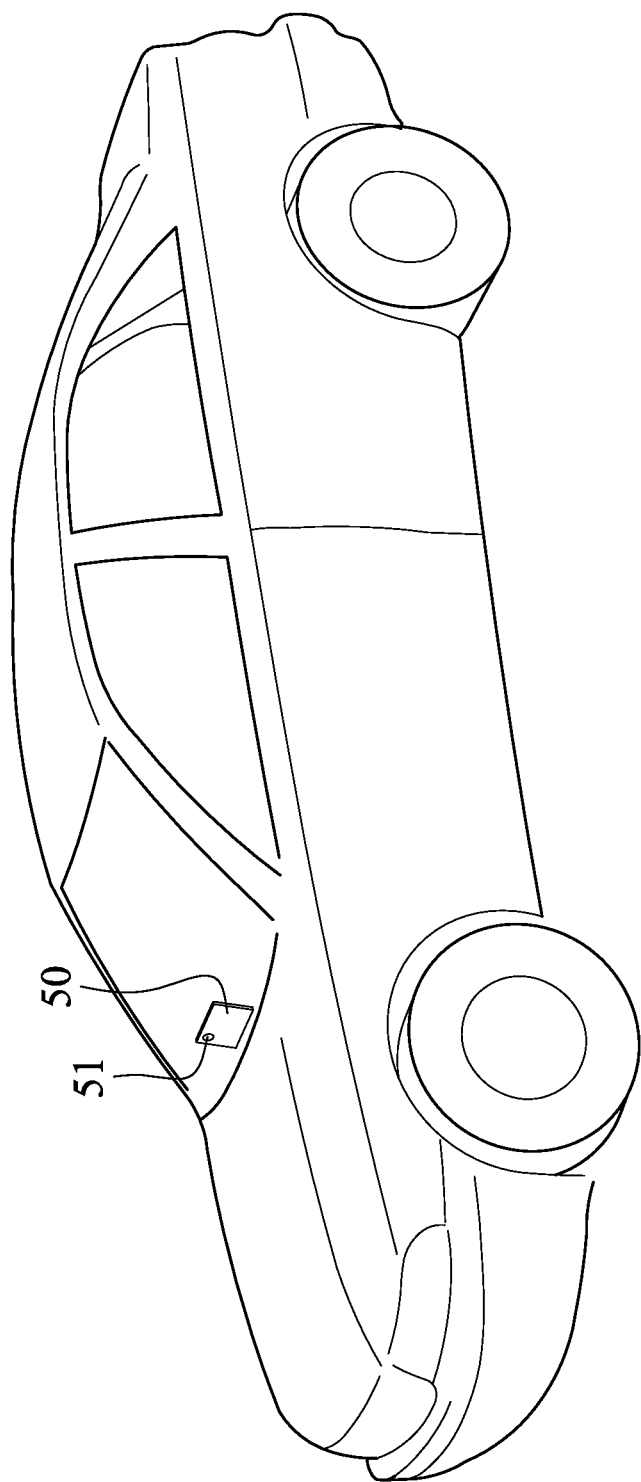
FIG. 23 shows an electronic terminal according to the 14th embodiment of the present disclosure.

FIG. 23 is a schematic view of an electronic terminal 50 according to the 14th embodiment of the present disclosure. The electronic terminal 50 of the 14th embodiment is a driving recorder, wherein the electronic terminal 50 includes an image capturing device 51. The image capturing device 51 includes a photographing lens system (its reference numeral is omitted) according to the present disclosure and an image sensor (its reference numeral is omitted), wherein the image sensor is disposed on an image surface of the photographing lens system.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising, in order from an object side to an image side:
   a first lens element with negative refractive power having a concave image-side surface;
   a second lens element having refractive power;
   a third lens element with positive refractive power having a convex object-side surface and a convex image-side surface;
   a fourth lens element with negative refractive power having a concave object-side surface, wherein the object-side surface and an image-side surface of the fourth lens element are aspheric; and
   a fifth lens element with positive refractive power having a convex object-side surface and a convex image-side surface, wherein the object-side surface and the image-side surface of the fifth lens element are aspheric, and at least one of the object-side surface and the image-side surface of the fifth lens element has at least one inflection point in an off-axial region thereon;
   wherein the photographing lens system has a total of five lens elements with refractive power, there is an air gap between any two of the first lens element, the second lens element, the third lens element, the fourth lens element and the fifth lens element that are adjacent to each other, a central thickness of the second lens element is CT2, a sum of central thicknesses of the first lens element, the second lens element, the third lens element, the fourth lens element and the fifth lens element is ΣCT, a curvature radius of the object-side surface of the fourth lens element is R7, a curvature radius of the image-side surface of the fourth lens element is R8, an axial distance between the second lens element and the third lens element is T23, and the following conditions are satisfied:

$1.0 < \Sigma CT/CT2 < 3.0;$ $(R7+R8)/(R7-R8) < -0.70;$ and $T23/CT2 < 0.55.$

2. The photographing lens system of claim 1, wherein the second lens element has positive refractive power.

3. The photographing lens system of claim 2, wherein a maximal field of view of the photographing lens system is FOV, and the following condition is satisfied:

$120 \text{ degrees} < FOV \leq 200 \text{ degrees}.$

4. The photographing lens system of claim 2, wherein a focal length of the photographing lens system is f, a composite focal length of the first lens element and the second lens element is f12, and the following condition is satisfied:

$0 < f/f12 < 0.40.$

5. The photographing lens system of claim 1, wherein a focal length of the photographing lens system is f, a focal length of the second lens element is f2, and the following condition is satisfied:

$|f/f2| < 0.30.$

6. The photographing lens system of claim 1, wherein the axial distance between the second lens element and the third lens element is T23, the central thickness of the second lens element is CT2, and the following condition is satisfied:

$T23/CT2<0.45$.

7. The photographing lens system of claim 1, wherein at least one of the object-side surface and the image-side surface of the fourth lens element has at least one inflection point in an off-axial region thereon.

8. The photographing lens system of claim 1, wherein the central thickness of the second lens element is CT2, the sum of the central thicknesses of the first lens element, the second lens element, the third lens element, the fourth lens element and the fifth lens element is ΣCT, and the following condition is satisfied:

$1.3<\Sigma CT/CT2<2.5$.

9. The photographing lens system of claim 1, wherein a focal length of the photographing lens system is f, a curvature radius of an object-side surface of the second lens element is R3, a curvature radius of an image-side surface of the second lens element is R4, and the following condition is satisfied:

$0.75<|f/R3|+|f/R4|<1.50$.

10. The photographing lens system of claim 1, wherein a refractive index of the second lens element is N2, a refractive index of the fourth lens element is N4, and the following condition is satisfied:

$3.0<N2+N4<3.5$.

11. The photographing lens system of claim 1, wherein the first lens element has a convex object-side surface.

12. The photographing lens system of claim 11, wherein the curvature radius of the object-side surface of the fourth lens element is R7, the curvature radius of the image-side surface of the fourth lens element is R8, and the following condition is satisfied:

$-2.5<(R7+R8)/(R7-R8)<-0.80$.

13. The photographing lens system of claim 11, wherein the third lens element, the fourth lens element and the fifth lens element are made of plastic material, and the photographing lens system further comprises:
a stop disposed between the second lens element and the third lens element.

14. An image capturing device, comprising:
the photographing lens system of claim 1; and
an image sensor, wherein the image sensor is disposed on an image surface of the photographing lens system.

15. An electronic terminal, comprising:
the image capturing device of claim 14.

16. A photographing lens system comprising, in order from an object side to an image side:
a first lens element with negative refractive power having a concave image-side surface;
a second lens element having refractive power;
a third lens element with positive refractive power having a convex object-side surface and a convex image-side surface;
a fourth lens element with negative refractive power having a concave object-side surface, wherein the object-side surface and an image-side surface of the fourth lens element are aspheric, and at least one of the object-side surface and the image-side surface of the fourth lens element has at least one inflection point in an off-axial region thereon; and
a fifth lens element with positive refractive power having a convex object-side surface and a convex image-side surface, wherein the object-side surface and the image-side surface of the fifth lens element are aspheric, and at least one of the object-side surface and the image-side surface of the fifth lens element has at least one inflection point in an off-axial region thereon;
wherein the photographing lens system has a total of five lens elements with refractive power, there is an air gap between any two of the first lens element, the second lens element, the third lens element, the fourth lens element and the fifth lens element that are adjacent to each other, a central thickness of the second lens element is CT2, a sum of central thicknesses of the first lens element, the second lens element, the third lens element, the fourth lens element and the fifth lens element is ΣCT, a curvature radius of the object-side surface of the fourth lens element is R7, a curvature radius of the image-side surface of the fourth lens element is R8, and the following conditions are satisfied:

$1.0<\Sigma CT/CT2<3.0$; and $(R7+R8)/(R7-R8)<-0.70$.

17. The photographing lens system of claim 16, wherein a refractive index of the second lens element is N2, a refractive index of the fourth lens element is N4, and the following condition is satisfied:

$3.0<N2+N4<3.5$.

18. The photographing lens system of claim 16, wherein a focal length of the photographing lens system is f, a composite focal length of the first lens element and the second lens element is f12, and the following condition is satisfied:

$0<f/f12<0.40$.

19. The photographing lens system of claim 16, wherein the central thickness of the second lens element is CT2, the sum of the central thicknesses of the first lens element, the second lens element, the third lens element, the fourth lens element and the fifth lens element is ΣCT, and the following condition is satisfied:

$1.3<\Sigma CT/CT2<2.5$.

20. The photographing lens system of claim 16, wherein the curvature radius of the object-side surface of the fourth lens element is R7, the curvature radius of the image-side surface of the fourth lens element is R8, and the following condition is satisfied:

$-2.5<(R7+R8)/(R7-R8)<-0.80$.

21. The photographing lens system of claim 16, wherein an axial distance between the second lens element and the third lens element is T23, the central thickness of the second lens element is CT2, and the following condition is satisfied:

$T23/CT2<0.50$.

22. The photographing lens system of claim 16, wherein an axial distance between the second lens element and the third lens element is T23, a central thickness of the third lens element is CT3, and the following condition is satisfied:

$T23<CT3$.

23. An image capturing device, comprising:
the photographing lens system of claim 16; and
an image sensor, wherein the image sensor is disposed on an image surface of the photographing lens system.

24. An electronic terminal, comprising:
the image capturing device of claim 23.

* * * * *